US009504968B2

(12) United States Patent
Takano

(10) Patent No.: US 9,504,968 B2
(45) Date of Patent: Nov. 29, 2016

(54) FOAMED WATER SAVING AERATOR

(76) Inventor: Masaaki Takano, Higashiosaka (JP)

(*) Notice: Subject to any disclaimer, the term of this patent is extended or adjusted under 35 U.S.C. 154(b) by 329 days.

(21) Appl. No.: 13/822,178

(22) PCT Filed: Sep. 7, 2011

(86) PCT No.: PCT/JP2011/070377
§ 371 (c)(1),
(2), (4) Date: May 8, 2013

(87) PCT Pub. No.: WO2012/033126
PCT Pub. Date: Mar. 15, 2012

(65) Prior Publication Data
US 2013/0214438 A1 Aug. 22, 2013

(30) Foreign Application Priority Data

Sep. 11, 2010 (JP) .................................. 2010-203809

(51) Int. Cl.
B01F 3/04 (2006.01)
E03C 1/084 (2006.01)

(52) U.S. Cl.
CPC ........... B01F 3/04241 (2013.01); E03C 1/084 (2013.01)

(58) Field of Classification Search
CPC combination set(s) only.
See application file for complete search history.

(56) References Cited

U.S. PATENT DOCUMENTS 2,707,624 A * 5/1955 Shames .................... E03C 1/084 210/460
2,741,467 A * 4/1956 Lee .......................... E03C 1/084 239/428.5
2,761,662 A * 9/1956 Goodrie .................. E03C 1/084 210/198.1
2,771,998 A * 11/1956 Holden ................... E03C 1/084 210/198.1
2,832,577 A * 4/1958 Goodrie .................. E03C 1/084 239/427
7,017,837 B2 3/2006 Taketomi et al.
2011/0215175 A1 9/2011 Takano

FOREIGN PATENT DOCUMENTS

JP 1-250535 10/1989
JP 2-142638 U 12/1990
JP 3-81428 4/1991
JP 3-165855 7/1991
JP 09-95985 4/1997

(Continued)

Primary Examiner — Duane Smith
Assistant Examiner — Adam W Bergfelder
(74) Attorney, Agent, or Firm — Hamre, Schumann, Mueller & Larson, P.C.

(57) ABSTRACT

The present invention provides a foamed-water generating aerator which is capable of generating good-quality foamed water containing fine, homogeneously distributed air bubbles. The foamed-water generating aerator (100) is fitted to a water discharge pipe to turn water being discharged into foamed water. A circumferential water flow curtain forming portion (110) includes a gap (111), through which water flows, and forms a three-dimensional circulating water flow curtain (112) in which an accelerated water-flow issuing downstream from the gap (111) is continuous in the circumferential direction. An air cavity (120) is provided at some intermediate point in a water-flow path as a place for forming the circulating water flow curtain (112) and sustains an air-filled condition even when a water-flow of the circulating water flow curtain enters therein. Air is drawn through an air ventilation hole (140) into an enclosed space, the enclosed space being defined by the circulating water flow curtain (112) formed in the air cavity (120) and a surrounding wall surface, is mixed with the circulating water flow curtain (112) to thereby form the foamed water.

12 Claims, 21 Drawing Sheets

(56) References Cited

FOREIGN PATENT DOCUMENTS

| JP | 2000-104300 | 4/2000 |
| JP | 2002-194798 | 7/2002 |
| JP | 2007-138662 | 6/2007 |
| JP | 4369993 B | 11/2009 |
| WO | 03/040481 | 5/2003 |

* cited by examiner (a)

(b)

(a)

Foamed water   Air ventilation   Foamed water (b)

Surrounding water flow curtain 112 provides an airtight state. Inner space 113 is filled with the air The air is introduced in the surrounding water flow curtain 112 when the water flow of the surrounding water flow curtain 112 is expanded outward Surrounding water flow curtain 112a provides an airtight state. Inner space 113 is filled with the air The air is introduced in the surrounding water flow curtain 112a when the water flow of the surrounding water flow curtain 112a is expanded outward (a)

(b)

The outer space 113c of the surrounding water flow curtain 112c provides an airtight state. Outer space 113c is filled with the air The air is introduced in the surrounding water flow curtain 112c when the water flow of the surrounding water flow curtain 112c is bent to inward to expand the outer space 113c.

The shield space 113d outer of the surrounding water flow curtain 112d provides an airtight state. Outer space 113d is filled with the air The air is introduced in the surrounding water flow curtain 112d when the water flow of the surrounding water flow curtain 112d is bent to inward to expand the shield space 113d (a)

The upper surface of the surrounding water flow curtain generating portion 110e (b)

The bottom surface of the surrounding water flow curtain generating portion 110e (a)

The upper surface of the surrounding water flow curtain generating portion 110f (b)

The bottom surface of the surrounding water flow curtain generating portion 110f

FOAMED WATER SAVING AERATOR

TECHNICAL FIELD

This invention relates to a foam water saving aerator attached to water delivery devices such as a water tap (including a general water tap and a special purpose water tap for laboratory use) and a shower head for saving the amount of the water flow and aerating the water for generating bubble foam water.

BACKGROUND ART

Bubble foam water is required in many water taps including ordinary homes and in commercial facilities. The impression from use of the bubble foam water in washing is quite gentle. Therefore the bubble foam water is preferably used in washing glasses and the dishes because cracking or damage to the surface of the glasses and the dishes can be avoided. The bubble foam water hardly rebounds even if it hits the surface of the glasses and the dishes in washing, so there is no fear of splashing water around the sink and deteriorating the environment. Therefore, the bubble foam water preferably is used in many water taps not only in ordinary homes but also in the railway station, in the public facilities, in the laboratory in the research institute, and so on.

In the prior art, one of the methods for making the bubble foam water is attaching a water saving aerator to the water delivery devices such as a water tap. The water saving aerator in the prior art comprises air ventilation holes for in taking outer air to the water flow as a basic structure. The outer air is mixed with the water flow via the air ventilation holes. In addition, the opening of the water delivery devices is covered by the net for cutting the water flow into small pieces. The bubble foam water is generated by mixing the outer air via air ventilation hole and cutting the water flow by installing several nets to the opening of the water delivery devices for cutting the water flow into small pieces.
Patent prior art 1: JP H09-095985
Patent prior art 2: JP 2000-104300

DISCLOSURE OF THE INVENTION

The Problems To Be Solved

The conventional water saving aerator described in the prior art has the following problem. The conventional water saving aerator can generate the bubble foam water including rough bubble, but it cannot generate the bubble foam water including a high quality fine bubble. The conventional water saving aerator supplies the outer air from the air ventilation holes located on the side wall to the water flow, so the outer air is mixed roughly in to the running water flow by being introduced from the side direction. The size of the involved bubble water is about several millimeters. After being introduced into water flow, the bubble is cut by a net or several nets into small pieces according to the water flow cutting. The bubble foam water is generated in this manner.

However, the conventional water saving aerator described in the prior art generates the bubble foam water by mixing roughly the outer air into water flow only at the position where the outer air is supplied from the side direction. In addition, the hole of the net is about several millimeters as expected and cannot generate fine bubble smaller than the hole of the net.

The first approach for generating the fine bubble foam in the conventional water saving aerator is based on increasing the contact area for outer air and water flow. However, it is impossible to increase the contact area in the horizontal direction if the outer air is supplied from the side direction to the water flow. It is possible to increase the contact area in the vertical direction since the length of the contact area with the air becomes large to the extent that the height of the water fall becomes large. Therefore, the amount of the mixing air becomes large. However, the vertical length of the apparatus becomes too large as the bubble foam water saving aerator to be attached to the water tap.

The second approach for generating the fine bubble foam in the conventional water saving aerator is based on decreasing the mesh size of the net. However, the smaller the mesh size of the net becomes, the larger the resistance to the water flow becomes. The bubble mixed in the bubble foam water larger than the mesh size of the net in the upper stream does not pass through the mesh of the net easily. If the mesh size of the net reaches the sub-millimeter level, there is a risk that the bubble is blocked and remains inside of the water tap, and that the air ventilation via the air ventilation hole is obstructed. In addition, if the mesh size of the net reaches the sub-millimeter level, there is a risk that the suspended particle and contaminant remains and blocks the mesh of the net.

If the mesh of the net wires double and triple in order to make the air bubbles in the foam water fine, scale and contaminants can be deposited easily and the water flow can be blocked. If the mesh of the net is blocked by the scale and contaminant, water flows out as normal water without forming a foam water, or water cannot flow out. In particular, such problem becomes readily apparent when the water quality is bad or the water hardness is high.

Therefore, it is an object of the present invention to provide a foam water saving aerator that can generate the high quality babble foam water including fine bubbles uniformly.

Means For Solving The Problems

In order to achieve the above-mentioned object, the present invention of a foam water saving aerator attached to the water tap for generating bubble foam water and flowing the bubble foam water comprises; a surrounding water flow curtain forming portion that includes a gap for flushing water flow, and forms a three-dimensional surrounding water flow curtain in which an accelerated water flow flushes downstream from the gap; an air cavity provided at an intermediate point of a water-flow route as a place for forming the surrounding water flow curtain that and sustains an air-filled condition even when a water flow of the surrounding water flow curtain flushes therein; a ventilation pass for supplying outer air to the shielded space shielded by the surrounding water flow curtain and supplying outer air to the water flow of the surrounding water flow curtain formed in the air cavity from the shielded space via an air ventilation hole; and a foamed water generating part for generating a foamed water by blowing the air through an air ventilation hole into the shielded space and mixing with the surrounding water flow curtain formed in the air cavity.

The shielded space provided by the surrounding water flow curtain generated dynamically in air cavity is not known in the conventional technology. Air will be mixed to the surrounding water flow curtain efficiently by the foamed water generating part, and the water curtain becomes a foamed water curtain efficiently.

The foam water saving aerator can include a diffuser object installed in the point where the water flow of the surrounding water flow curtain hit, for diffusing the water flow of the surrounding water flow curtain to the direction for expanding the shielded space while sustaining the airtightness of the shielded space. The foam water can be generated by increasing the blowing of the air from the air ventilation hole by decreasing the air pressure at the expansion position of the shielded space by changing the water flow of the surrounding water flow curtain.

When the air pressure in the shielded space formed by the surrounding water flow curtain is decreased, the outer air is blown to the low air pressure shielded space at a high speed via the ventilation pass. The air is injected to the surrounding water flow curtain efficiently, and forms a high quality foam water including rich fine bubbles and containing large volume of air.

The shielded space is generated dynamically in the air cavity in a water flow, and the position of the shielded space can be both in an inner space of the surrounding water flow curtain and in an outer space between the surrounding water flow curtain and the wall of the air cavity.

The first pattern is that the shielded space is an inner space of the surrounding water flow curtain. The foam water saving aerator can includes a diffuser object contacting the bottom surface of the surrounding water flow curtain and has skew to change the water flow direction of the surrounding water flow curtain to outside. When the water flow of the surrounding water flow curtain turns to the outside, the inner shielded space in the surrounding water flow curtain is expanded, so the air pressure is decreased at the point where the water flow of the surrounding water flow curtain hits the diffuser object. Therefore, a lot of air can be mixed to the surrounding water flow curtain from the inner shielded space especially at the point where the water flow of the surrounding water flow curtain hits the diffuser object.

The second pattern is that the shielded space is an outer space between the surrounding water flow curtain and the wall of the air cavity. The diffuser object contacts the bottom surface of the surrounding water flow curtain and has skew to change the water flow direction of the surrounding water flow curtain to the center. When the water flow of the surrounding water flow curtain turns to the center, the outer space between the surrounding water flow curtain and the wall of the air cavity is expanded, so the air pressure is decreased at the point where the water flow of the surrounding water flow curtain hits the diffuser object. Therefore, a lot of air can be mixed to the surrounding water flow curtain from the outer shielded space especially at the point where the water flow of the surrounding water flow curtain hits the diffuser object.

Various patterns of the shape of the gap in the surrounding water flow curtain forming portion and the shape of the formed water flow of the surrounding water flow curtain can be used.

The first pattern is that the gap of the surrounding water flow curtain forming portion is a circumferential gap, and the shape of the surrounding water flow curtain flushed from the circulating gap becomes the cylinder shape.

The second pattern is that the gap of the surrounding water flow curtain forming portion is a circumferential gap and has a taper with diameter becoming small according to the depth, wherein the shape of the surrounding water flow curtain flushed from the circulating gap becomes an inverted frustoconical shape.

The third pattern is that the gap of the surrounding water flow curtain forming portion is a circumferential gap and has a taper with diameter becoming large according to the depth, wherein the shape of the surrounding water flow curtain flushed from the circulating gap becomes a frustoconical shape.

There are other patterns except for the above three patterns.

In either pattern, shield and airtightness in the bottom area of the inner shielded space should be maintained in order to enhance the airtightness of the inner shielded space formed by the surrounding water flow curtain and the wall of the air cavity. The airtightness of the shielded space should be maintained even when the foamed water generated in the shielded space runs out from the foam water outflow opening located on the bottom part of the shielded space. For this reason, the position, the shape and the size of the foam water outflow opening are modified as the outer air cannot ventilate directly via the foam water outflow opening, in order to keep the airtightness. If the running foamed water occupies and covers the whole area of the foam water outflow opening, the outer air cannot ventilate through the foam water outflow opening to the shielded space directly, the airtightness can be achieved. By prohibiting outer air ventilation via the foam water outflow opening, the airtightness of the shielded space can be maintained even when the foamed water runs out from the foam water outflow opening.

Next, there are a variety patterns of the gap array in the surrounding water flow curtain forming portion.

The gap array in the surrounding water flow curtain forming portion is not limited to the circumferential gap. For example, there are plural gaps arrayed in the circle, the accelerated water flows running down from the gaps are merged, the three-dimensional surrounding water flow curtain spread out in circle without the break in the space of the air cavity. If the three-dimensional surrounding water flow curtain spreads out in a circle without a break in the space of the air cavity, the gaps need not be connected to each other.

Next, it is preferable that the water saving aerator further comprises a surrounding water flow curtain surface area variable mechanism for varying the shape and surface area of the surrounding water flow curtain generated dynamically in the air cavity; wherein the amount of the air mixed to the surrounding water flow curtain can be adjusted by varying the contact area between the surrounding water flow curtain and the supplied air.

Next, it is also preferable that the water saving aerator further comprises a ventilation pass variable mechanism for varying the hole size of the ventilation pass and varying the speed of the air drawn from the ventilation pass wherein the speed of the air mixed to the surrounding water flow curtain can be adjusted.

Next, it is also preferable that the water saving aerator further comprises a gap width variable mechanism for varying the gap width, wherein the thickness of the surrounding water flow curtain can be adjusted.

Effect of the Invention

According to the above-mentioned configuration of the invention of the foamed water saving aerator can provide the shielded space in the surrounding water flow curtain formed in the foamed water saving aerator. The outer air provided via the ventilation pass can be injected to the surrounding water flow curtain rapidly by utilizing the air pressure change in the inner space surrounded by the surrounding water flow curtain, so high quality foamed water including rich fine bubbles and containing large amounts of air can be generated.

BRIEF DESCRIPTION OF THE DRAWINGS

FIG. 7 is a schematic view of the status when the water is running through the foamed water saving aerator 100a.

Figure 1:
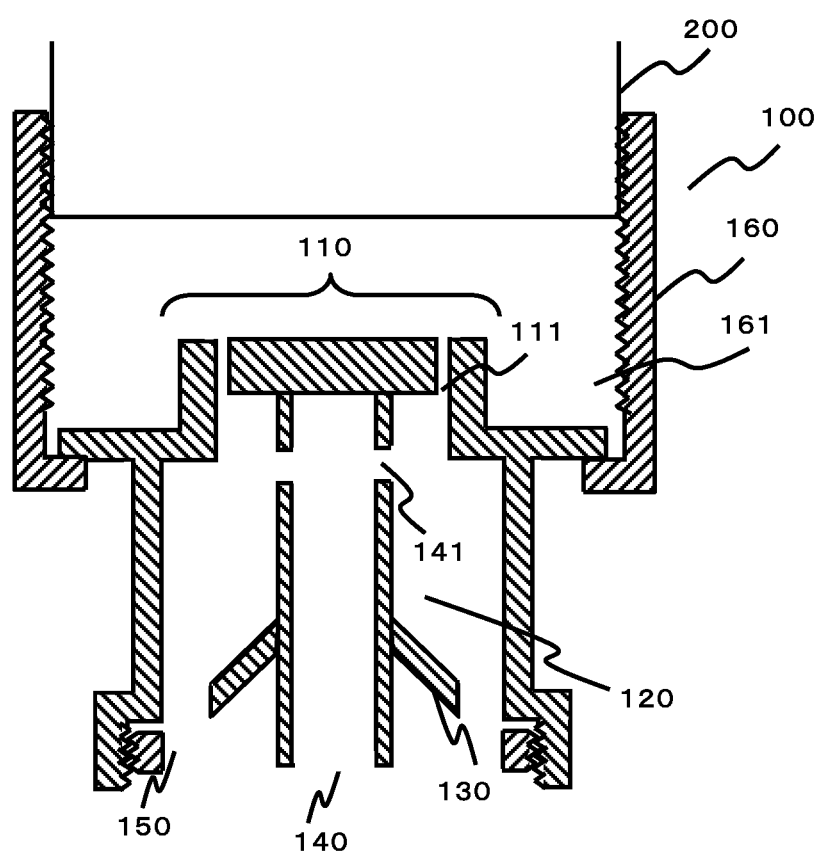
FIG. 1 is a schematic view of the foamed water saving aerator 100 of the present invention in embodiment 1.

THE REFERENCE NUMBER IN THE FIGS 100 denotes a foamed water saving aerator
101 denotes a part
102 denotes a part
103 denotes a part
110 denotes a surrounding water flow curtain forming portion
111 denotes a gap
112 denotes a surrounding water flow curtain
113 denotes a shielded space
114 denotes a rest space
120 denotes an air cavity
130 denotes a diffuser object
140 denotes an air ventilation pass
141 denotes an air ventilation hole
150 denotes a foam water outflow opening
160 denotes an attachment part
161 denotes a water cavity

DETAILED DESCRIPTION OF THE PREFERRED EMBODIMENT

Some embodiments of a foam water saving aerator according to the present invention are described below with reference to the relevant drawing. Needless to add, the claims of the present invention include but are not limited to the application, configuration, or quantity shown in the following embodiments.

Embodiment 1

A schematic view of the foam water saving aerator 100 is shown as an example of this embodiment 1. The foam water saving aerator 100 shown in Embodiment 1 generates the surrounding water flow curtain as a cylindrical water flow curtain, and provides the inner space surrounded by the surrounding water flow curtain as the shielded space; and the diffuser object has a skew for expanding the water flow of the surrounding water flow curtain to outside.

Figure 2:
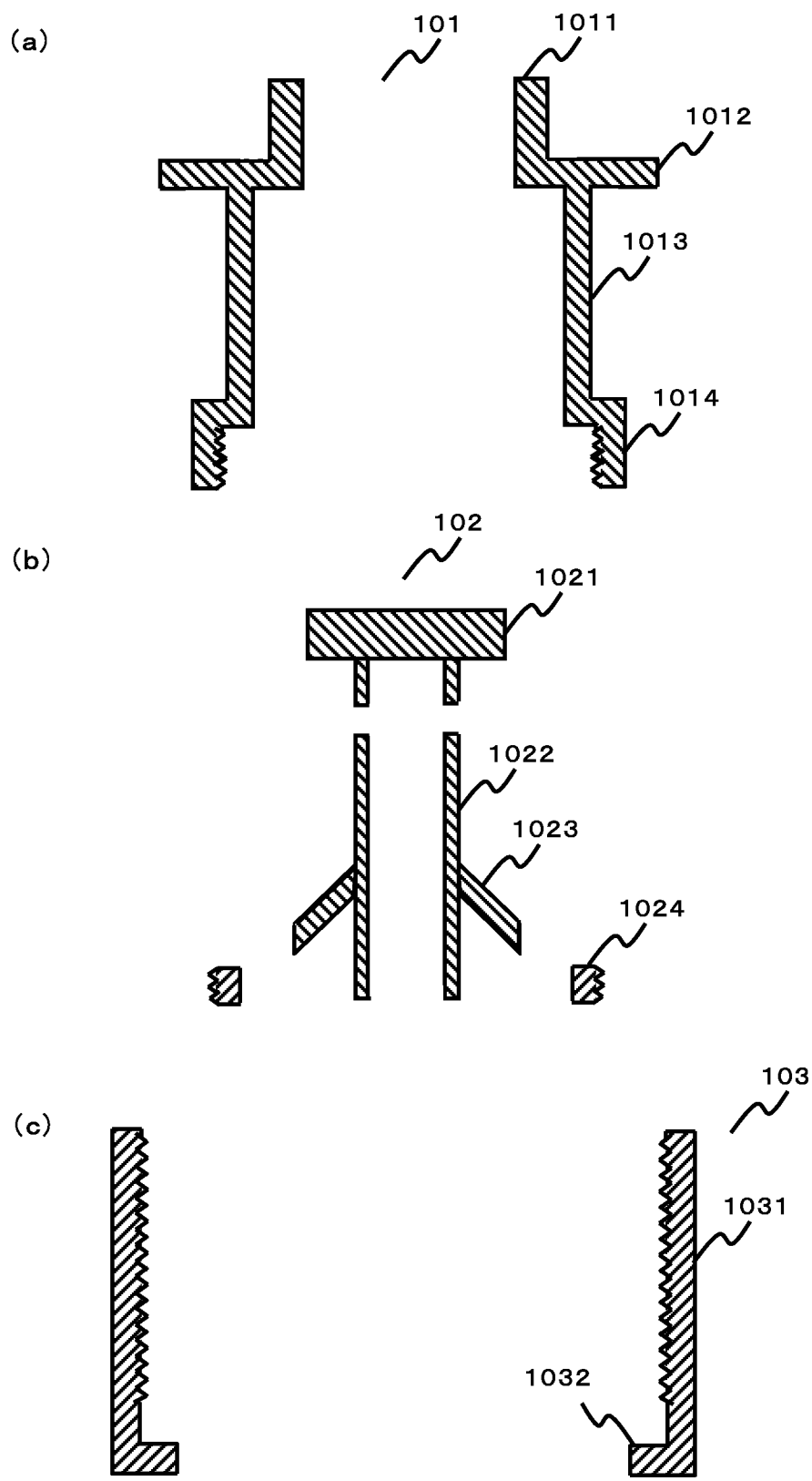
FIG. 2 is an exploded view showing the configuration of the foamed water saving aerator 100 as the part 101, the part 102, and the part 103.
Figure 3:
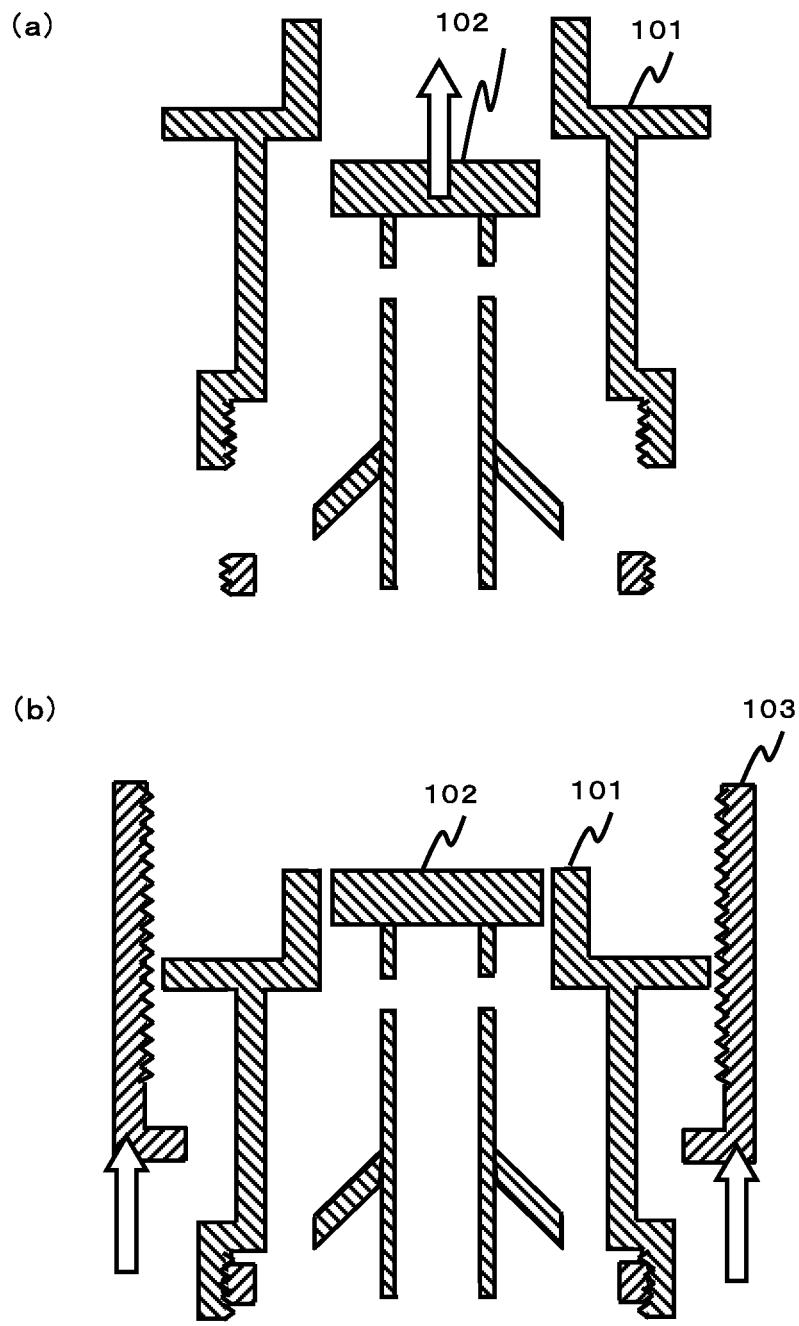
FIG. 3 is a schematic view showing a procedure for assembling the part 101, the part 102, and the part 103.
Figure 4:
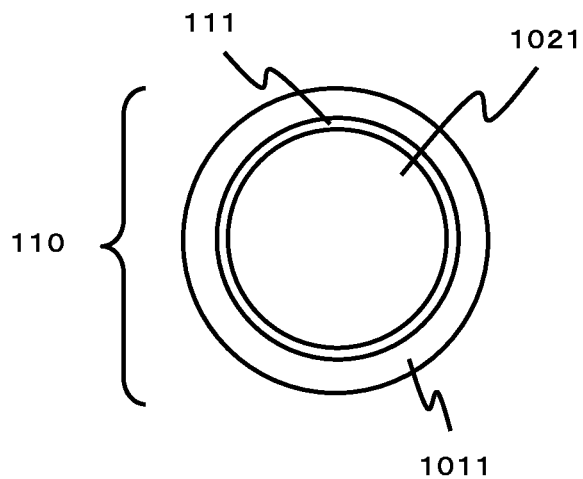
FIG. 4 is a schematic view showing an upper surface (surrounding water flow curtain forming portion 110) and lower surface (the ventilation path 140, the foamed water outflow part 150) in the assembled state of the part 101 and the part 102.
Figure 4:
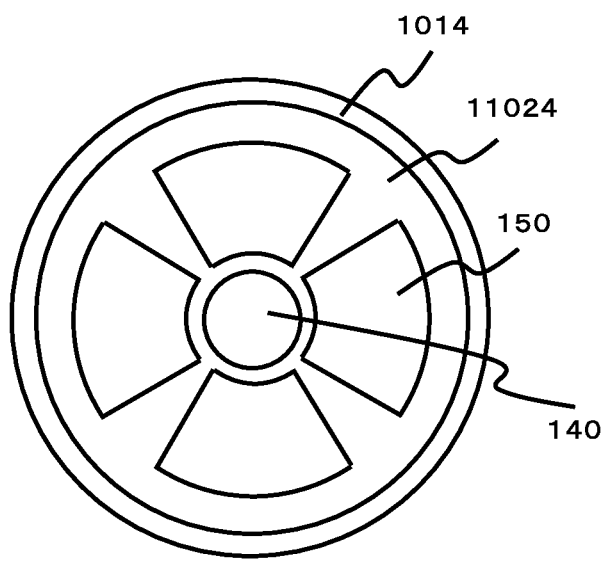
Figure 5:
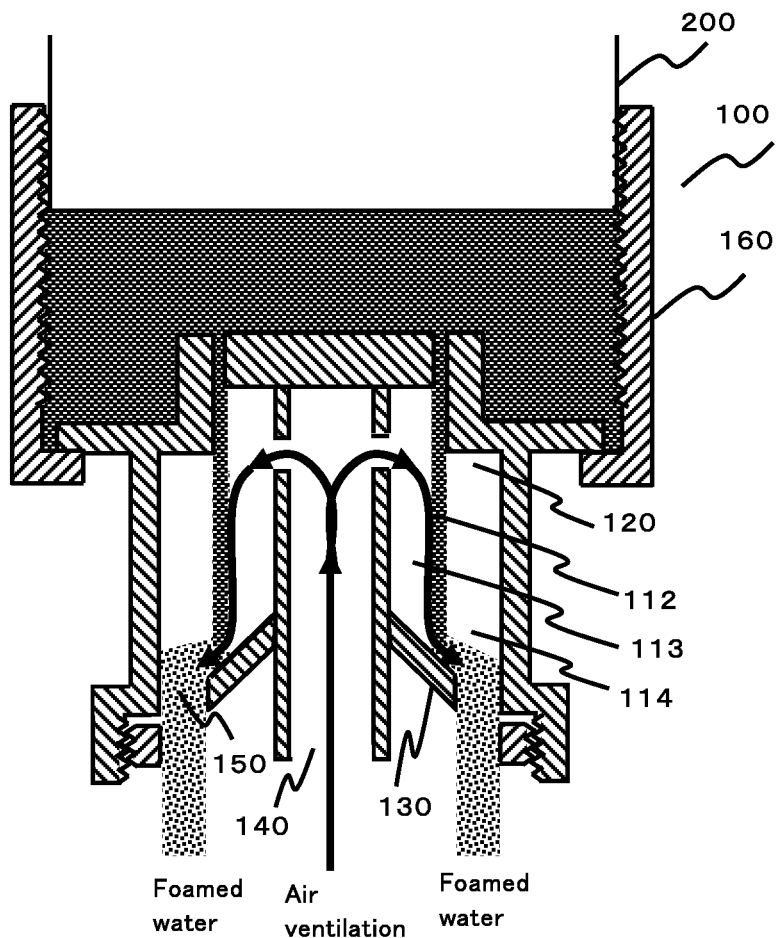
FIG. 5 is a schematic view showing how foamed water is formed by injecting air from the inner space to the surrounding water flow curtain generated dynamically in the air cavity when the water is running through the foamed water saving aerator 100.
Figure 5:
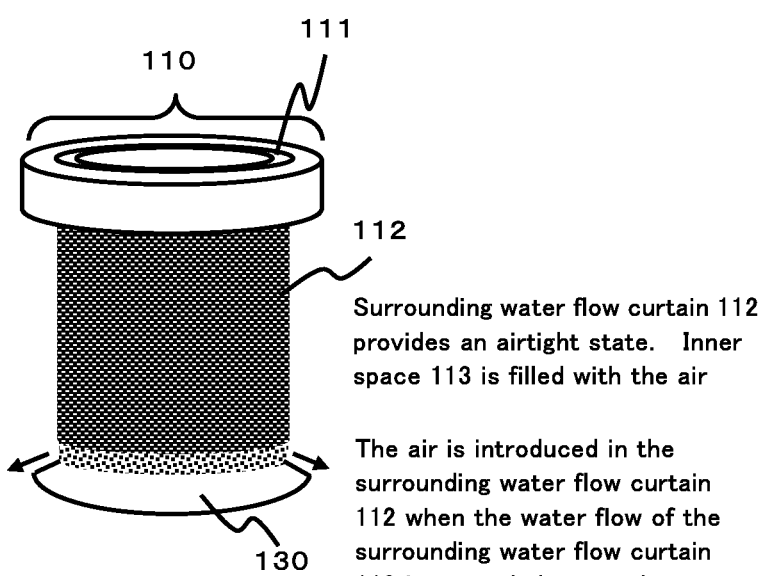

The foam water saving aerator 100 of the present invention comprises the surrounding water flow curtain forming portion 110, the air cavity 120, the diffuser object 130, the air ventilation pass 140, the attachment 160, and the foam water outflow opening 150. FIG. 1 is a schematic view of the foamed water saving aerator 100. In the configuration shown in FIG. 1, there are 3 parts, the part 101, the part 102 and the part 103. FIG. 2 is an exploded view showing the configuration of the foamed water saving aerator 100 as the part 101, the part 102, and the part 103. FIG. 3 is a schematic view showing a procedure for assembling the part 101, the part 102, and the part 103. FIG. 4 is a schematic view showing an upper surface (surrounding water flow curtain forming portion 110) and lower surface (the ventilation path 140, the foamed water outflow part 150) in the assembled state of the part 101 and the part 102. FIG. 5 is a schematic view showing how foamed water is formed by injecting air from the inner space to the surrounding water flow curtain 112 formed in the air cavity when the water supplied from the faucet 200 is running through the foamed water saving aerator 100.

In order to understand the internal structure easily, FIG. 1, FIG. 2, FIG. 3 and FIG. 5 are shown in the vertical cross sectional view.

In this FIG. 1, FIG. 2, FIG. 3 and FIG. 5, the foamed water saving aerator 100 is shown as a rotation body rotated around the vertical axis. However, the air ventilation hole 141 is not a rotation body but several holes opened in the wall defining the air ventilation pass 140 and connected to the inner shielded space of the surrounding water flow curtain 112. Also, the foam water outflow openings 150 are the several holes on the bottom area in order to release the water flow of the surrounding water flow curtain 112.

First, each component is described, then the mechanism is described for how foamed water is generated by introducing and mixing the outer air to the surrounding water flow curtain 112 formed when water flushes into the foamed water saving aerator from the faucet 200.

The part 101 is a rotation body as shown in FIG. 2 (*a*) and it is a tube-shaped membrane having a vertical cross sectional view as shown. There are an upper tubular body 1011, a flange 1012, a central tubular body 1013 and a lower tubular body 1014, in which, a screw thread is provided at the inner wall of the lower tubular body 1014.

To reduce the number of components in this example, the structure of the surrounding water flow curtain forming portion 112 and air cavity 120 are provided by the part 101 and the part 102.

The part 102 comprises the disc body 1021 at the top and the tubular body 1022 beneath the disc body 1021. The air ventilation pass 140 is formed in the tubular body 1022 and several holes are formed in the wall of the tubular body 1022. These holes are the air ventilation holes 141. The umbrella-shaped body 1023 is installed on the wall of the tubular body 1022. This umbrella-shaped body 1023 is the diffuser object 130. In addition, the disk 1024 is nearby the bottom of the tubular body 1022. The tubular body 1022 and the disk 1024 are connected via the radial bridge as shown in FIG. 4 (*b*). The holes on the disk 1024 are the foam water outflow opening 150. A screw thread is formed on the outer wall of the disk 1024.

To reduce the number of components in this example, the structure of the surrounding water flow curtain forming portion 110, the air cavity 120, the diffuser object 130 and the air ventilation pass 140 are provided by the part 101 and the part 102.

The part 103 is a rotation body as shown in FIG. 2 (*c*) and it is a tube-shaped membrane having a vertical cross sectional view as shown. There are the tubular body 1031, and the hollow disk 1032 on the bottom of the tubular body 1031. A screw thread is formed on the inner wall of the tubular body 1031. This portion is the attachment 160 attached to the outer surface of the faucet 200. The hollow disk 1032 of the part 103 is the component for locking the flange 1012 of the part 101.

Assembling of the part 101, the part 102 and the part 103 is conducted as follows. First, the part 102 is inserted to the inside of the part 102 and the thread on the outer wall of the disk 1024 of the part 102 is screwed into the thread formed on the inner wall of the lower tubular body 1014 of the part 104 as shown in FIG. 3 (*a*).

FIG. 4 is a schematic view showing upper surface and lower surface in the assembled state of the part 101 and the part 102.

In the assembled status where the part 101 is attached to the part 102, the surrounding water flow curtain forming portion 110 is formed by the upper tubular body 1011 of the part 101 and the disk 1021 of the part 102 in the upper portion of the assembled state as shown in FIG. 4 (*a*). Both radiuses are adjusted to make the gap 111 between the inner wall of the upper tubular body 1011 of the part 101 and the outer wall of the disk 1021 of the part 102. This gap 111 is provided as a part of the water flow route in the foamed water saving aerator 100.

In the assembled state where the part 101 is attached to the part 102, the foam water outflow opening 150 is formed as the opening opened in the disk 1024 of the part 102 and the air ventilation pass 140 is formed on the inner wall of the central tubular body 1013 in the lower portion of the assembled status as shown in FIG. 4 (*b*).

Next, the flange body 1012 of the part 101 is attached to the hollow disk 1032 of the part 103 in the assembled state with the part 101 attached to the part 102, then the foamed water saving aerator 100 is assembled. Therefore, the part 101 and the part 102 are held by the part 103. The state shown in FIG. 1 is obtained by attaching the assembled foamed water saving aerator 100 to the faucet 200.

The foamed water saving aerator 100 is assembled as shown above. Next, each component of the foamed water saving aerator 100 is described.

The surrounding water flow curtain forming portion 110 comprises a gap 111 as the water flow route and it injects the accelerated water flow from the gap 111 to the air cavity downstream and forms the three-dimensional surrounding water flow curtain in the air cavity space.

In this configuration, the surrounding water flow curtain forming portion 110 is formed by the upper tubular body 1011 of the part 101 and the disk 1021 of the part 102. The surrounding water flow curtain forming portion 110 has gap 111 connected to the air cavity 120 to inject the accelerated water flow from the water cavity 161. The shape of the inner wall of the gap 111 determines the injection direction of the accelerated water flow and determines the shape of the surrounding water flow curtain 112 generated by the accelerated water flow. The gap 111 is provided between the inner wall of the upper tubular body 1011 of the part 101 and the outer wall of the disk 1021 of the part 102. In this configuration shown in FIG. 1, the gap 111 of the surrounding water flow curtain forming portion 110 is formed vertically.

If the water flow comes to the gap 111 of the surrounding water flow curtain forming portion 110 from the upper side, the surrounding water flow curtain 112 is formed downstream. The surrounding water flow curtain 112 becomes a three-dimensional water flow curtain spread out in a circle without a break in the space of the air cavity. The space of the air cavity is divided into the inner space and the outer space by the surrounding water flow curtain 112. This surrounding water flow curtain 112 has no break, so the inner space becomes the shielded space 113 having the airtightness. In the configuration shown in FIG.1, the surrounding water flow curtain 112 becomes the cylinder shape as shown in FIG.5.

The water saving merit is achieved by the surrounding water flow curtain forming portion 110. If the width of the gap 111 is smaller than the diameter of the water cavity 161, the water flow is squeezed and the amount of the injected water flow from the gap 111 becomes small, so the water saving merit is obtained. The foamed water saving aerator 100 generates the high quality foamed water including a large amount of air by introducing a lot of air in the water flow, so the apparent volume of the injected foamed water from the foamed water saving aerator 100 becomes larger than the actual volume of the running water. The water use satisfaction of the user does not deteriorate.

Next, the air cavity 120 is a space generated dynamically at an intermediate point of the water flow and filled with the air. It is provided as a space for generating the surrounding water flow curtain 112. The air cavity 120 keeps on being filled with the air even if the water flow flushes into the air cavity and the surrounding water flow curtain 112 is generated. In this configuration, the air cavity 120 is provided as the space surrounded by the inner wall of the central tubular body 1013 of the part 101, the outer wall of the tubular body 1022 of the part 102 and the upper surface of the umbrella-shaped body 1023.

The air ventilation holes 141 are formed in the air ventilation pass 140 located at the inner space side of the surrounding water flow curtain 112, so the air is supplied from the outside.

The diffuser object 130 is arrayed beneath the surrounding water flow curtain 112 generated in the air cavity 120, and turns the direction of the water flow of the surrounding water flow curtain. In this configuration, the position and the angle of the diffuser object are adjusted to expand the surrounding water flow curtain to the outer direction. In this configuration, the umbrella-shaped body 1023 of the part 102 works as the diffuser object 130. For example, the position of the diffuser object 130 is where the downstream edge of the generated a surrounding water flow curtain hits. The umbrella-shaped body 1023 is located at the impact position. The skew angle is the angle expanding to the outer direction from the center to turn the surrounding water flow curtain to the outer direction. The diffused water runs out from the foam water outflow opening 150, which is the gap between the diffuser object 130 and the inner wall of the foamed water saving aerator.

The air ventilation pass 140 is an air ventilation pass connected the shielded space 113 in the surrounding water flow curtain 112 and the outer air. The air ventilation hole 141 is located in the shielded space 113 of the surrounding water flow curtain 112. In this configuration, the space of the tubular body 1022 of the part 102 is provided as the air ventilation pass 140, and the plural holes opened in the wall of the tubular body 1022 are provided as the air ventilation holes 141.

The foam water outflow opening 150 is a portion of the water drain in which the foamed water flows downstream after hitting the diffuser object 130 and turning its direction. The foam water outflow opening 150 supplies the generated foamed water. In this configuration, the foam water outflow opening 150 is formed by two portions. One is the gap between the inner wall of the central tubular body 1013 of the part 101 and the umbrella-shaped body 1023 of the part 102. The other is the holes located between the umbrella-shaped body 1023 of the part 102 and the disk 1024.

It is preferable that the position, shape and area are adjusted appropriately to keep the airtightness of the shielded inner space even while the foamed water is running out. The foam water generated in the shielded space runs out from the foam water outflow opening. Therefore, if the running foam water outflow occupies and covers the whole area of the foam water outflow opening, no air passage for the outside air exists in the shielded space via the foam water outflow opening. As a result, the airtightness of the shielded space is maintained even if the foam water runs through the shielded space and runs out from the foam water outflow opening.

The attachment part 160 is a component for attaching to the faucet 200. The attachment part 160 has a connecting portion whose inner diameter corresponds to the outer diameter of the faucet 200. In this configuration, the thread is formed on the outer surface of the faucet 200, and the thread is formed on the inner surface of the attachment 160. The two are attached by screwing. Therefore, the attachment 160 connects firmly to the faucet 200 and does not disconnect even if the water pressure is supplied with an appropriate pressure. In addition, the attachment part 160 works as an input portion of the water input from the faucet 200. In this example, there is a water cavity 161 filled with water in the inner of the attachment part 160. In addition, the attachment 160 works as a tubular body wall surrounding the surrounding water flow curtain forming portion 110.

In this example, the inner space of the tubular body 1031 of the part 103 is the water cavity 161. The female screw installed in the inner surface of the tubular body 1031 is a female screw screwed to the male screw installed in the outer wall of the faucet 200.

Next, the foamed water generating part in the foamed water saving aerator 100 is described. The foamed water generating part generates foamed water by blowing the air rapidly in the surrounding water flow curtain by decreasing the air pressure of the inner space. The air pressure is decreased at the point where the water flow is expanded in the outer direction by turning the water flow direction of the surrounding water flow curtain 112 with the diffuser object 130. The mechanism of the foamed water generating part is described in detail.

FIG. 5 is a schematic view showing the status when the water flow is running through the foamed water saving aerator 100 from the faucet 200. As with FIG. 1, FIG. 5 is shown in the vertical cross sectional view in order to understand the internal water flow state easily. The water flow, the air flow and the generated foamed water are shown simply.

The water supplied from the faucet 200 to the water cavity 161 is accepted on the upper surface of the surrounding water flow curtain forming portion 110 and the water goes down via the gap 111 by the water pressure of the water cavity 161. The width of the gap 111 is smaller than the diameter of the water cavity 161, so the water flow is squeezed and accelerated when running through the gap 111 and the water flow is injected to the air cavity 120. In this configuration, the shape of the gap 111 is the circumferential shape, so the water flow accelerated by the gap 111 injected to the air cavity 120 becomes the three-dimensional cylinder shape as shown in FIG. 5 (b).

In this example, the surrounding water flow curtain 112 has no break and spreads out in a circle. Therefore, the space of the air cavity 120 is divided into the inner space and the outer space by the water flow curtain. The inner space of the surrounding water flow curtain 112 maintains the airtightness, and it is provided as the shielded space 113 filled with air. The rest space 114 as the outer space is also filled with the air.

In this configuration, as shown in FIG. 5 (a) and FIG. 5 (b), the diffuser object 130 is beneath the surrounding water flow curtain 112, so the water flow of the surrounding water flow curtain 112 hits the diffuser object 130 and turns its direction to the outer direction. Therefore, the air pressure will decrease at the point where the water flow of the surrounding water flow curtain 112 hits the diffuser object 130 because the shielded space 113 is expanded.

The water flow accelerated by the gap 111 runs rapidly downstream, and the air facing the water flow of the surrounding water flow curtain 112 is introduced. Especially, the air is rapidly introduced into the surrounding water flow curtain 112 where the air pressure is decreased by hitting the diffuser object 130 as shown in FIG. 5 (a), so a large amount of air is mixed and the high quality foamed water is obtained. The water flow becomes a flowing thin film and the air is introduced into the thin water flow curtain, so the bubble is spread out and diffused uniformly, and then the high quality foamed water is obtained.

The outer air can be supplied from the air ventilation pass 140 via the air ventilation hole 141 because the air pressure in the shielded space 113, and the air pressure around the air ventilation hole 141 are decreased in turn.

Most conventional mechanisms of the foamed water aerator introduce the air by the air ventilation holes installed on the water flow pipe filled with water flow. However, the mechanism of the foamed water saving aerator 100 of the present invention has the air cavity 120 filled with the air even if the water flow runs through the air cavity 120. The surrounding water flow curtain 112 is generated in the air cavity 120 and the shielded space 113 with airtightness is provided by the water curtain. The present invention utilized a totally new idea of the air be rapidly injected to the water thin film by utilizing the air pressure decrease by changing the water flow direction of the surrounding water flow curtain. In addition, the foamed water saving aerator 100 of the present invention injects the air to the thin water flow curtain spread in the air cavity filled with the air, and high quality foamed water including a large amount of air can be obtained.

The faster the accelerated water flow runs, the more the air pressure is decreased. So as the speed of the air injected to the water flow curtain becomes faster, the amount of the air mixed to the water flow curtain becomes larger. The air injected to the water flow curtain spreads out in the water flow curtain uniformly and changes into the fine bubbles.

The generated foamed water runs from the diffuser object 130 to the foam water outflow opening 150. The diffuser object 130 diffuses the accelerated water flow and can adjust the speed of the accelerated water flow appropriately for the washing hand water. This merit is called "the speed adjusting effect". In addition, the diffuser object 130 can expand the diameter of the surrounding water flow curtain appropriately for the washing hand water. This merit is called "the water flow diameter adjusting effect". As shown above, the speed and the diameter of the foamed water can be adjusted.

As shown in FIG. 5 (*a*), the foamed water generated in the shielded space 113 of the air cavity runs out from the foam water outflow opening 150, which is the gap between the diffuser object 130 located in the bottom of the shielded space 113 of the air cavity and the wall 1013. The position, the shape and the area of the foam water outflow opening 150 are selected appropriately, so the whole area of the foam water outflow opening 150 is occupied and covered by the foamed water, and the outside air does not come from the foam water outflow opening 150. The shielded space 113 is not ventilated directly via the foam water outflow opening 150. In this configuration, the airtightness of the shielded 113 space can be maintained even while the generated foamed water flows out from the foam water outflow opening 150.

As shown above, according to the foamed water saving aerator of the embodiment 1, the surrounding water flow curtain 112 is generated in the air cavity 120 and the inner space is supplied as the shielded space 113. The air is injected to the water thin film of the surrounding water flow curtain 112 by decreasing its air pressure by changing the water flow direction. High quality foamed water can be generated.

Embodiment 2

Various shapes are available as the surrounding water flow curtain shape. Embodiment 2 shows several examples of how the surrounding water flow curtain is formed. One is an inverted frustoconical shape and the other is a frustoconical shape. In this embodiment 2, the inner space surrounded by the surrounding water flow curtain is provided as the shielded space, and the diffuser object has a skew for expanding the water flow of the surrounding water flow curtain to the outside.

Figure 6:
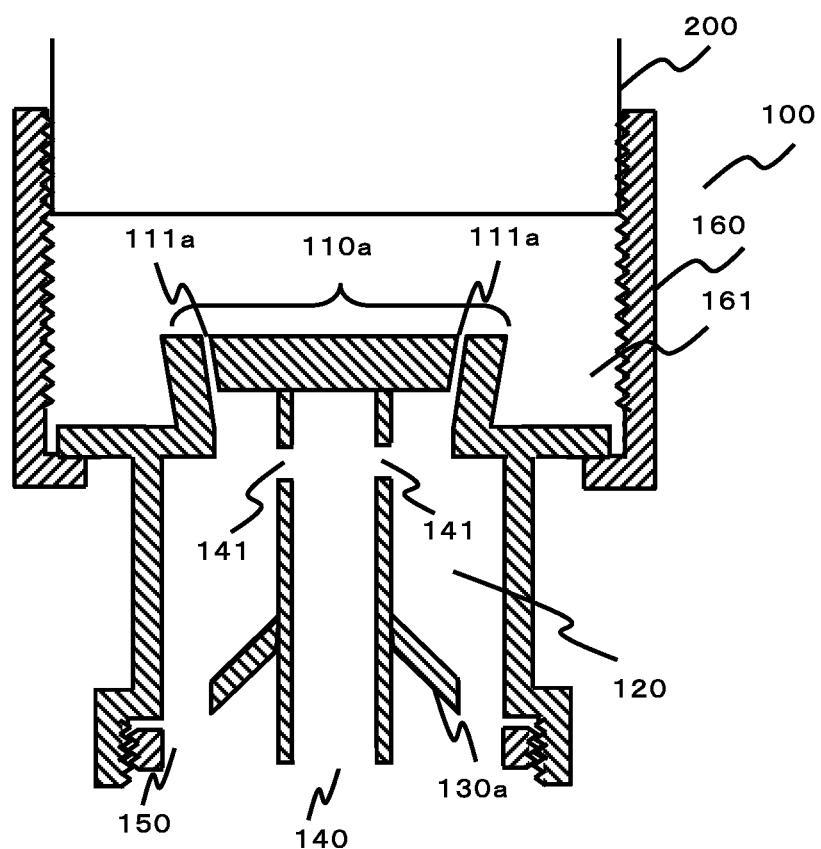
FIG. 6 is a schematic view of the foamed water saving aerator 100a of the present invention in embodiment 2.

FIG. 6 is a schematic view of the foamed water saving aerator 100*a* of the present invention in embodiment 2 which generates the surrounding water flow curtain as the inverted frustoconical shape.

As shown in FIG. 6, the foam water saving aerator 100*a* comprises the surrounding water flow curtain forming portion 110, the air cavity 120, the diffuser object 130, the air ventilation pass 140, the foam water outflow opening 150 and the attachment 160.

In order to understand the internal structure easily, FIG. 6 is shown in the vertical cross sectional view.

In the below description, for the same components as those shown in embodiment 1, the explanation is omitted in this embodiment 2.

As shown in FIG. 6, the surrounding water flow curtain forming portion 110*a* comprises the gap 111*a* for accelerating and flushing the water from the water cavity 161 to the air cavity 120. The gap 111*a* is a circumferential gap and has a taper whose diameter becomes small according to the depth. As shown in FIG. 6, the gap 111*a* has a skew to the center.

The shape of the inner wall of the gap 111*a* determines the injection direction of the accelerated water flow and determines the shape of the surrounding water flow curtain 112*a* generated by the accelerated water flow. In this configuration, the surrounding water flow curtain 112*a* becomes the inverted frustoconical shape water flow curtain. The water flow curtain divides the inner space of the surrounding water flow curtain 112*a* and the outer space, and the inner space of the surrounding water flow curtain 112*a* becomes the shielded space 113*a* whose airtightness is maintained.

Figure 7:
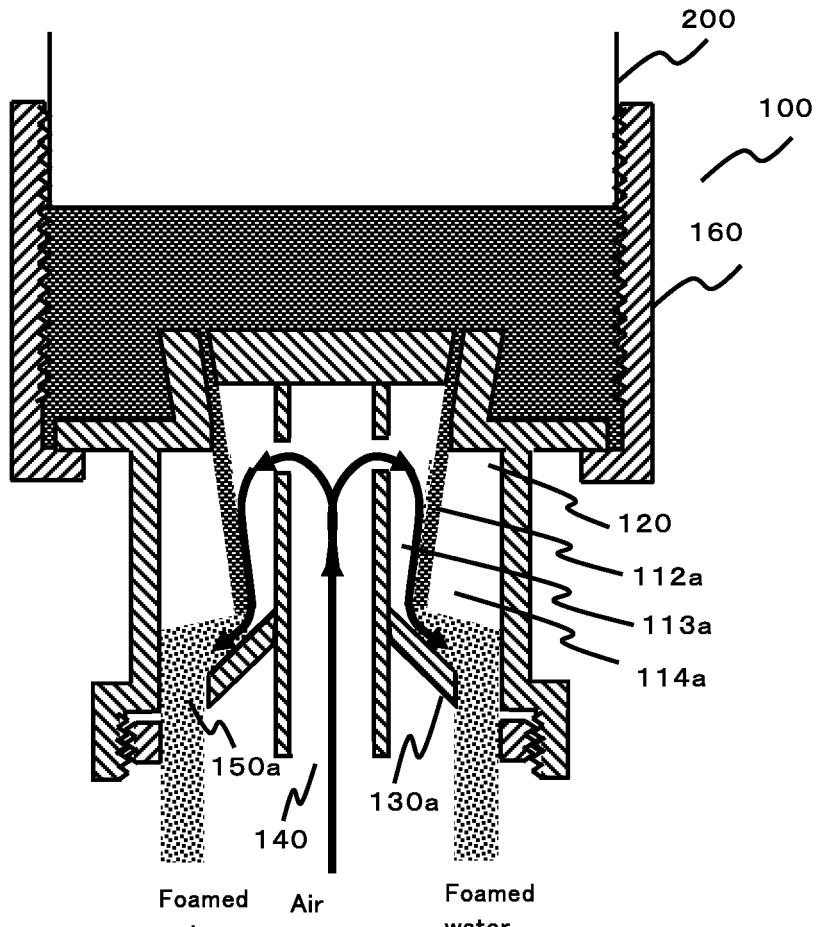
Figure 7:
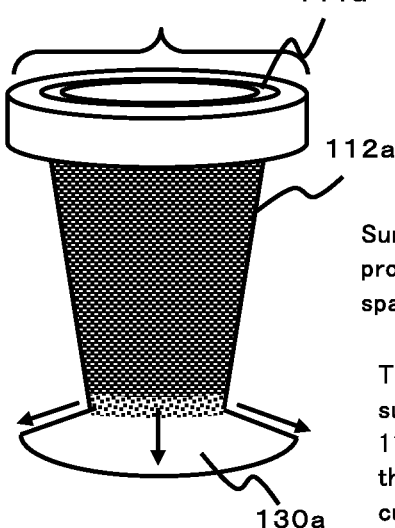

FIG. 7 (*a*) is a schematic view of the state when the water is running through the foamed water saving aerator 100*a*. The same as FIG. 6, FIG. 7 (*a*) is shown in the vertical cross sectional view in order to understand the internal structure easily. FIG. 7 (*a*) shows the water flow, the air flow and the generated foamed water simply.

The water supplied from the faucet 200 to the water cavity 161 is accepted on the upper surface of the surrounding water flow curtain forming portion 110*a* and the water goes down via the gap 111*a* by the water pressure of the water cavity 161. The gap 111*a* is a circumferential gap and has a taper whose diameter becomes small according to the depth, so the accelerated water flow flushed into the air cavity 120 becomes the three-dimensional inverted frustoconical shape.

In this configuration, the diffuser 130 *a* is installed on the bottom of the surrounding water flow curtain 112*a*.

In the configuration shown in FIG. 7 (*a*) and FIG. 7 (*b*), this surrounding water flow curtain 112*a* has no break, so the air cavity is divided into the inner space and outer space by the surrounding water flow curtain 112*a*. The inner space becomes the shield space 113*a* having airtightness.

The inner space of the surrounding water flow curtain 112*a* keeps airtightness, and it is provided as the shielded space 113*a* filled with the air. The rest part 114*a* as the outer space of the surrounding water flow curtain 112*a* is also filled with the air.

The mechanism of the air injection to the surrounding water flow curtain 112*a* generated by the water flow flushed from the gap 111*a* is the same as that of the embodiment 1.

In this configuration, as shown in FIG. 7 (*a*) and FIG. 7 (*b*), there is the diffuser object 130*a* beneath the surrounding water flow curtain 112*a*, so the water flow of the surrounding water flow curtain 112*a* hits the diffuser object 130*a* and turns its direction to the outer direction. Therefore, the air pressure will decrease at the point where the water flow of the surrounding water flow curtain 112a hits the diffuser object 130a because the shielded space 113a is expanded at this point.

The water flow accelerated by the gap 111a runs rapidly downstream, so the air facing the water flow of the surrounding water flow curtain 112a is introduced. Especially, the air is rapidly introduced into the surrounding water flow curtain 112a where the air pressure is decreased by hitting the diffuser object 130a as shown in FIG. 7 (a), so a large amount of air is mixed and the high quality foamed water is obtained. The water flow becomes a thin water flow curtain and the air is introduced into the thin water flow curtain, so the bubble is spread out and diffused uniformly, and then the high quality foamed water is obtained.

The generated foamed water runs from the diffuser object 130a to the foam water outflow opening 150.

As shown in FIG. 7 (a), the foamed water generated in the shielded space 113a of the air cavity runs out from the foam water outflow opening 150a which is the gap between the diffuser object 130a located in the bottom of the shielded space 113a of the air cavity and the wall 1013. Because whole area of the foam water outflow opening 150a is occupied and covered by the foamed water, the outer air does not come from the foam water outflow opening 150a. The shielded 113a space does not ventilate directly via the foam water outflow opening 150a. In this configuration, the airtightness of the shielded space 113a can be maintained even while the generated foamed water flows out from the foam water outflow opening 150a.

As show above, the surrounding water flow curtain 112a is generated as the inverted frustoconical shape by modifying the shape of the gap 111a of the surrounding water flow curtain forming portion 110a, and the air pressure is decreased by changing the flow direction of the water flow, and the high quality foamed water can be generated by rapid injection of the air to the surrounding water flow curtain 112a.

Next, the other example is described.

Figure 8:
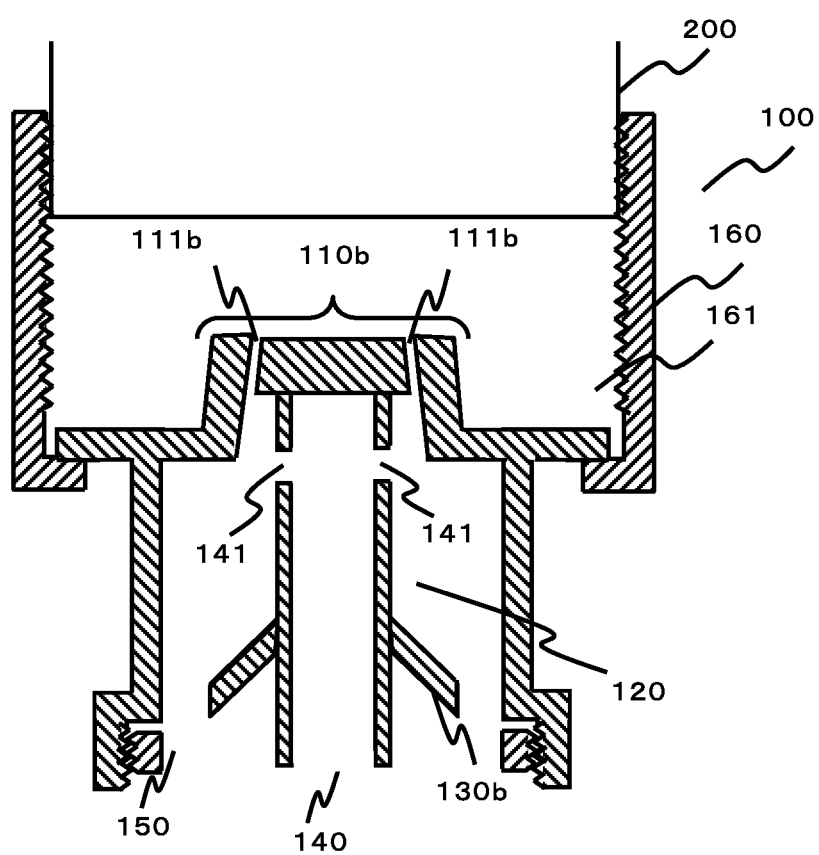
FIG. 8 is a schematic view of another foamed water saving aerator 100b of the present invention in embodiment 2.

FIG. 8 is a schematic view of another foamed water saving aerator 100b of the present invention in embodiment 2, which generates the surrounding water flow curtain as the frustoconical shape.

As shown in FIG. 8, the foam water saving aerator 100b comprises the surrounding water flow curtain forming portion 110b, the air cavity 120, the diffuser object 130, the air ventilation pass 140, the foam water outflow opening 150 and the attachment 160.

In order to understand the internal structure easily, FIG. 8 is shown in the vertical cross sectional view.

As shown in FIG. 8, the surrounding water flow curtain forming portion 110b comprises the gap 111b for accelerating and flushing the water from the water cavity 161 to the air cavity 120. The gap 111b is a circumferential gap and has a taper whose diameter becomes large according to the depth. As shown in FIG. 8, the gap 111b has skew to the outside.

The shape of the inner wall of the gap 111b determines the injection direction of the accelerated water flow and determines the shape of the surrounding water flow curtain 112b generated by the accelerated water flow. In this configuration, the surrounding water flow curtain 112b becomes the frustoconical shape water flow curtain. The water flow curtain defines the inner space of the surrounding water flow curtain 112b and the outer space, and the inner space of the surrounding water flow curtain 112b becomes the shielded space 113b whose airtightness ismaintained.

Figure 9:
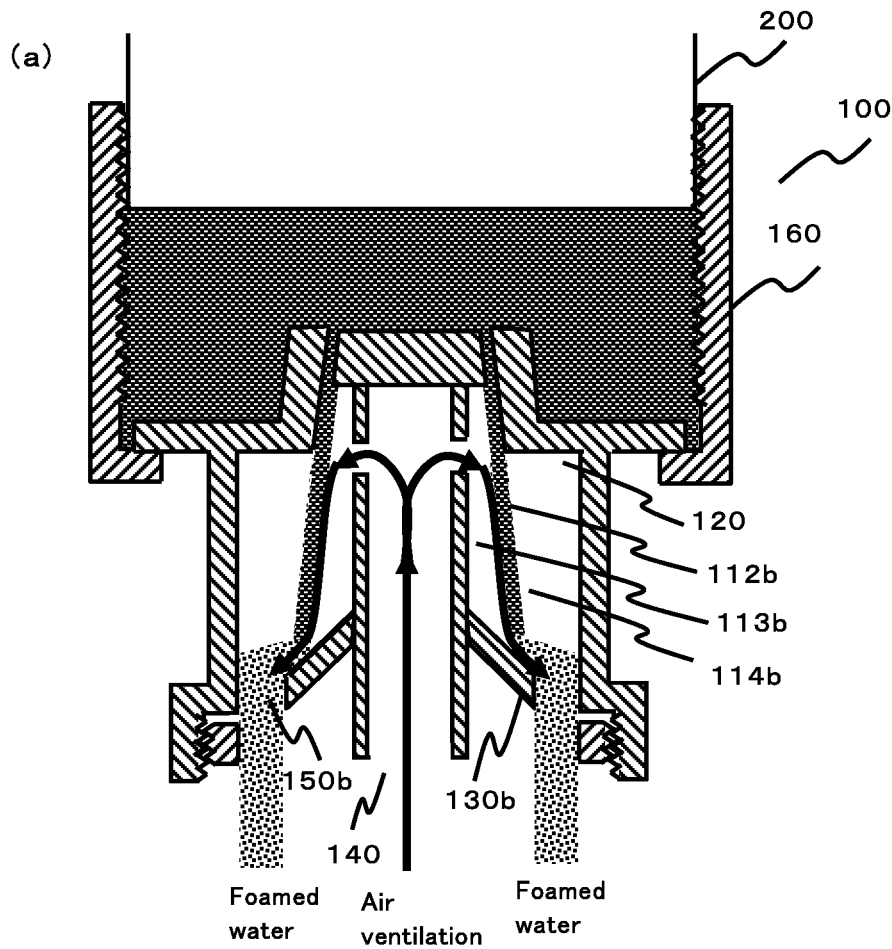
FIG. 9 is a schematic view of the status when the water is running through the foamed water saving aerator 100b.
Figure 9:
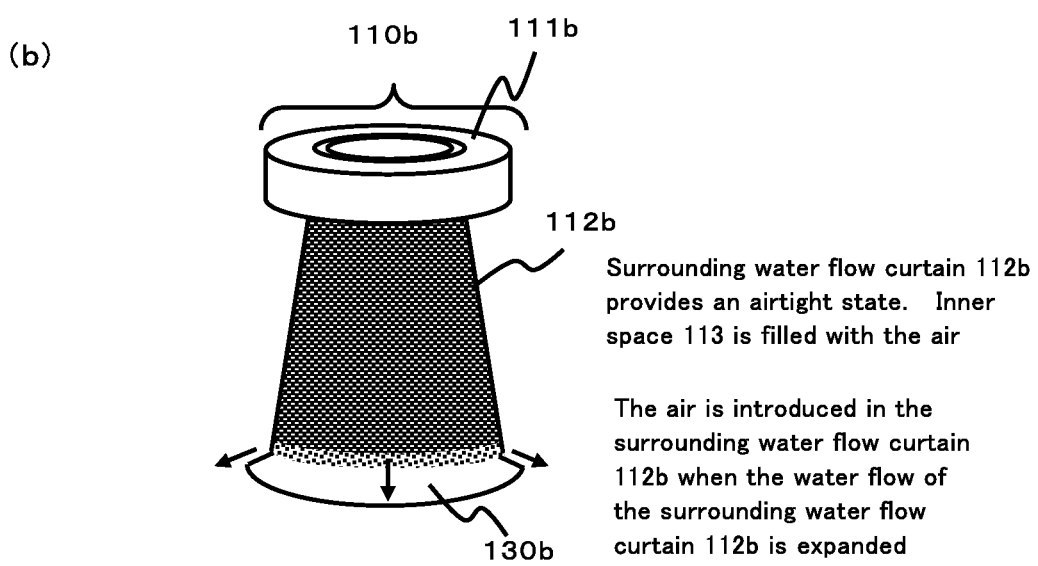

FIG. 9 (a) is a schematic view of the state when the water is running through the foamed water saving aerator 100b. The same as FIG. 5, FIG. 9 (a) is shown in the vertical cross sectional view in order to understand the internal structure easily. FIG. 9 (a) shows the water flow, the air flow and the generated foamed water simply.

The water supplied from the faucet 200 to the water cavity 161 is accepted on the upper surface of the surrounding water flow curtain forming portion 110b and the water goes down via the gap 111b by the water pressure of the water cavity 161. The gap 111b is a circumferential gap and has a taper whose diameter becomes large according to the depth, so the accelerated water flow flushes into the air cavity 120 and becomes the frustoconical shape. In this configuration, the diffuser 130b is installed on the bottom of the surrounding water flow curtain 112b, and the airtightness improves by sealing the bottom of the surrounding water flow curtain 112b.

In the configuration shown in FIG. 9 (a) and FIG. 9 (b), this surrounding water flow curtain 112b has no break, so the air cavity is divided into the inner space and outer space by the surrounding water flow curtain 112b. The inner space becomes the shielded space 113b having the airtightness.

The mechanism of the air injection to the surrounding water flow curtain 112b generated by the water flow flushed from the gap 111b is the same as that of the embodiment 1.

In this configuration, as shown in FIG. 9 (a) and FIG. 9 (b), the diffuser object 130b is beneath the surrounding water flow curtain 112b, so the water flow of the surrounding water flow curtain 112b hits the diffuser object 130a and turns its direction to the outer direction. Therefore, the air pressure will decrease at the point where the water flow of the surrounding water flow curtain 112b hits the diffuser object 130b because the shielded space 113b is expanded.

The water flow accelerated by the gap 111b runs rapidly downstream, and the air facing with the water flow of the surrounding water flow curtain 112b is introduced. Especially, the air is rapidly introduced into the surrounding water flow curtain 112b where the air pressure is decreased by hitting the diffuser object 130b as shown in FIG. 9 (a), so a large amount of air is mixed and the high quality foamed water is obtained. The water flow becomes a thin water flow curtain and the air is introduced into the thin water flow curtain, so the bubbles are spread out and diffused uniformly, and the high quality foamed water is obtained.

The generated foamed water runs from the diffuser object 130a to the foam water outflow opening 150.

As shown in FIG. 9 (a), the foamed water generated in the shielded space 113b of the air cavity runs out from the foam water outflow opening 150b, which is the gap between the diffuser object 130b and the wall 1013. Because the whole area of the foam water outflow opening 150b is occupied and covered by the foamed water, the outside air does not come from the foam water outflow opening 150b. The shielded space 113b is not ventilated directly via the foam water outflow opening 150b. In this configuration, the airtightness of the shielded space 113b can be maintained even while the generated foamed water flows out from the foam water outflow opening 150b.

As show above, the surrounding water flow curtain 112b is generated as the frustoconical shape by modifying the shape of the gap 111b of the surrounding water flow curtain forming portion 110b, and the air pressure is decreased by changing the flow direction of the water flow, and the high quality foamed water can be generated by rapid injection of the air to thesurrounding water flow curtain 112b.

As shown above, the area of the surrounding water flow curtain 112 generated in the air cavity 120 can be modified according to the shape of the surrounding water flow curtain 112. As a result, the contacting area of the surrounding water flow curtain 112 and the air, and the amount of the air introduced into the surrounding water flow curtain 112 can be changed. The amount of air in the foamed water can be adjusted by controlling the shape of the surrounding water flow curtain 112. In this specification, the mechanism for controlling the area of the surrounding water flow curtain 112 generated in the air cavity 120 is called "surrounding water flow curtain surface area variable mechanism". It is not limited how to configure the mechanism for varying the shape of the surrounding water flow curtain formed in the air cavity and varying the surface area of the surrounding water flow curtain. For example, the skew of the gap 111 of the surrounding water flow curtain forming portion 110 can be modified by a slide mechanism or a screw mechanism. For example, the slide mechanism or screw mechanism is installed in order to adjust the shape of the surrounding water flow curtain forming portion 110 shown in FIG. 1 and FIG. 5, the surrounding water flow curtain forming portion 110a shown in FIG. 6 and FIG. 7, and the surrounding water flow curtain forming portion 110b shown in FIG. 8 and FIG. 9.

The area of the surrounding water flow curtain 112 generated in the air cavity 120 can be controlled by the mechanism for modifying the height of the diffuser object 130. Therefore, such a mechanism for modifying the height of the diffuser object 130 can be utilized as the "surrounding water flow curtain surface area variable mechanism".

Embodiment 3

The above-mentioned Embodiment 2 shows the foamed water saving aerator configuration in which the shielded space is an outer space between the surrounding water flow curtain and the wall of the air cavity, and the diffuser object has a skew to collect the water flow to the center.

In the following description in embodiment 3, the description for the components that are the same as those of the embodiment 1 is omitted hereinafter; the description for the component which are not employed in embodiment 1 is emphasized.

Figure 10:
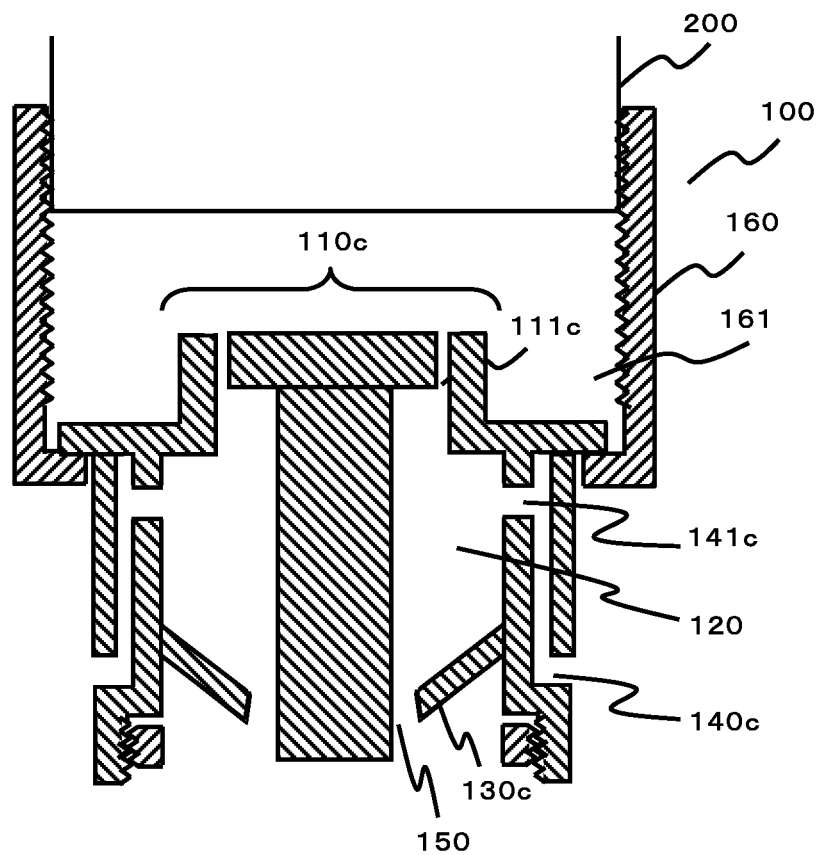
FIG. 10 is a schematic view of the foamed water saving aerator 100c of the present invention in embodiment 3.

FIG. 10 is a schematic view of the foamed water saving aerator 100c that generates the surrounding water flow curtain as the cylinder shape.

As shown in FIG. 10, the foam water saving aerator 100c comprises the surrounding water flow curtain forming portion 110c, the air cavity 120, the diffuser object 130c, the air ventilation pass 140c, the foam water outflow opening 150 and the attachment 160. In order to understand the internal structure easily, FIG. 10 is shown in the vertical cross sectional view.

Figure 11:
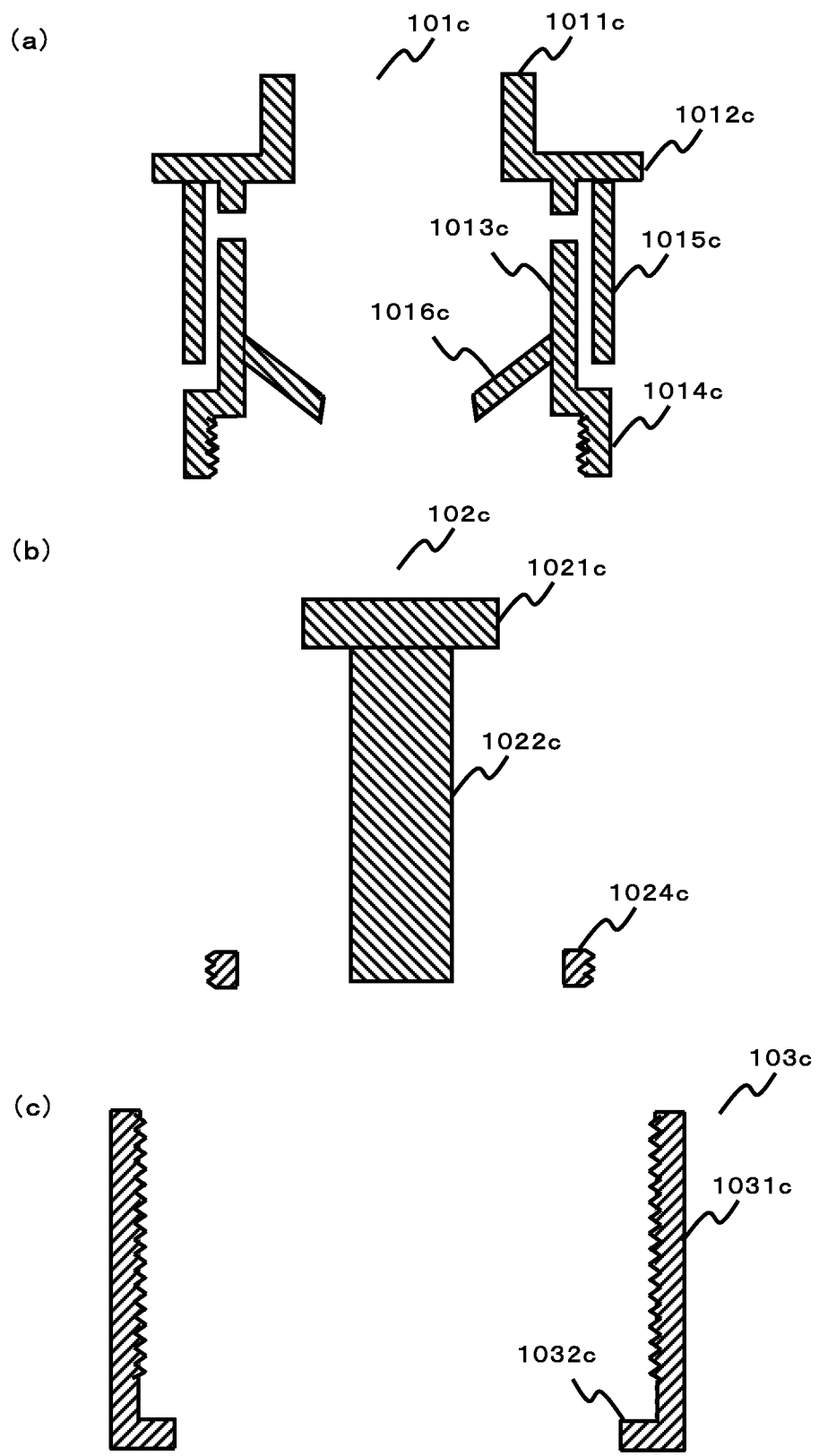
FIG. 11 is an exploded view showing the configuration of the foamed water saving aerator 100c as the part 101c, the part 102c, and the part 103c.

As shown in the exploded configuration in FIG. 11, there are 3 parts; the part 101c, the part 102c and the part 103c are combined.

In this configuration, the surrounding water flow curtain forming portion 110c is formed in the upper portion of the part 101 and the part 102. The shape of the inner wall of the surrounding water flow curtain forming portion 110c is the same as that of the embodiment 1. The surrounding water flow curtain 112c is generated in the air cavity 120 as the cylinder-shape closed water flow curtain the same as the surrounding water flow curtain 112 shown in FIG. 5.

The air cavity 120c is provided as the space surrounded by the inner wall of the central tubular body 1013c of the part 101c and the outer wall of the tubular body 1022c of the part 102c.

The diffuser object 130c is different from the diffuser object 130 shown in FIG. 1. It is provided as the part 1016c of the part 101c and attached to the inner wall of the air cavity with a skew descending from the periphery side to the central side.

The air ventilation pass 140c is formed in the part 102c side. It is different from that of embodiment 1. In this configuration, the air ventilation pass 140c is formed among the part 1013c of the part 102c, the part 1014c and the part 1015c to ventilate the outside air.

Figure 12:
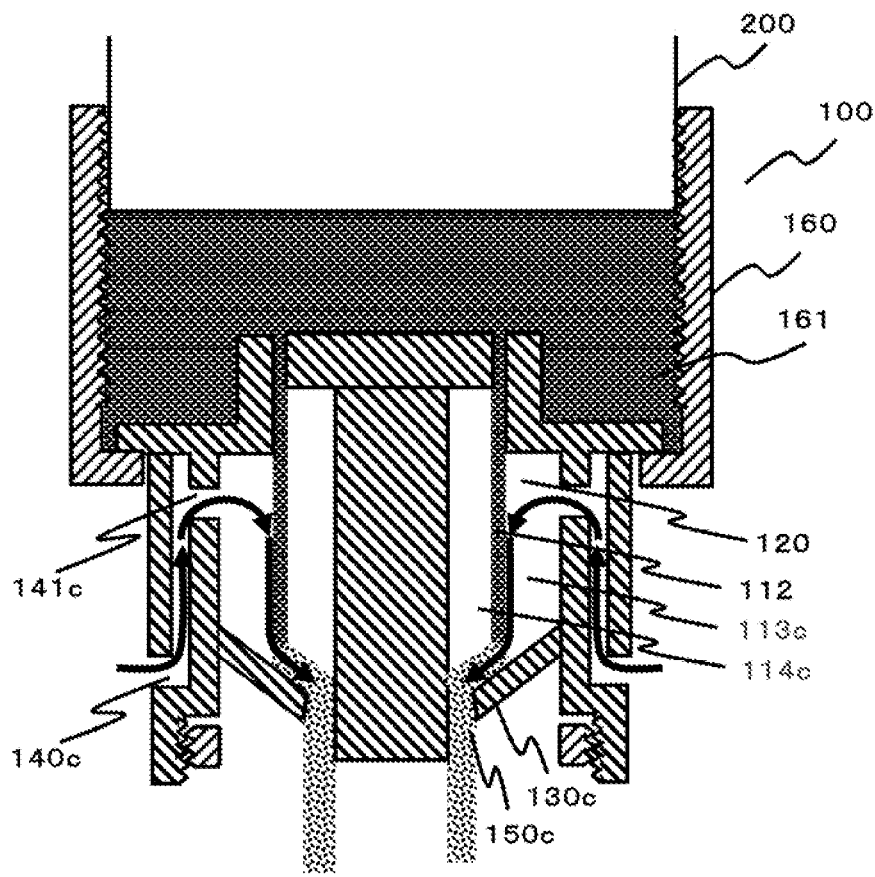
FIG. 12 is a schematic view of the status when the water is running through the foamed water saving aerator 100c.
Figure 12:
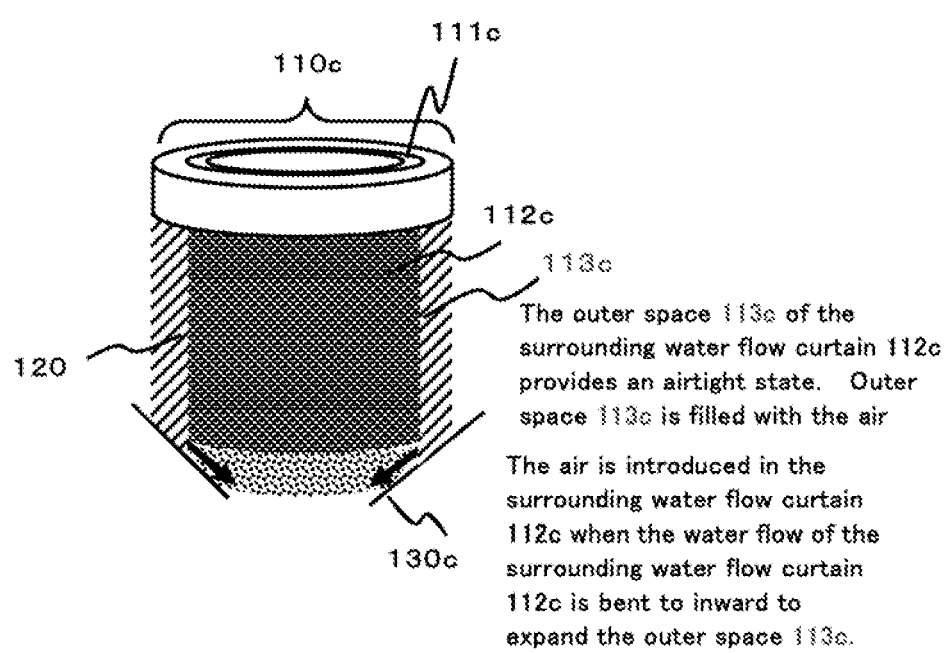

FIG. 12 (a) is a schematic view showing the state when the water flow is running through the foamed water saving aerator 100c from the faucet 200. As in FIG. 5, it is shown in the vertical cross sectional view in order to understand the internal water flow status easily. The water flow, the air flow and the generated foamed water are shown simply.

The water supplied from the faucet 200 to the water cavity 161 is accepted on the upper surface of the surrounding water flow curtain forming portion 110c and the water goes downs via the gap 111c by the water pressure of the water cavity 161. The accelerated water flow generates the three-dimensional surrounding water flow curtain 112c as shown in FIG. 5 (b).

As shown in FIG. 12 (a) and FIG. 12 (b), this surrounding water flow curtain 112c has no break, so the air cavity 120 is divided into the inner space and outer space by the surrounding water flow curtain 112c. The outer space of the surrounding water flow curtain 112c is surrounded by the surrounding water flow curtain 112c and the wall 1013c, so the outer space becomes the shield space 113c having the airtightness.

The outer space of the surrounding water flow curtain 112c keeps air tightness, and is provided as the shielded space 113c filled with the air. The rest part 114c as the inner space of the surrounding water flow curtain 112c is also filled with the air.

The mechanism of the air injection to the surrounding water flow curtain 112c generated by the water flow flushed from the gap 111c is the same as that of the embodiment 1.

In this configuration, as shown in FIG. 12 (a) and FIG. 12 (b), there is the diffuser object 130c beneath the surrounding water flow curtain 112c, so the water flow of the surrounding water flow curtain 112c whose shape is cylindrical hits the diffuser object 130c and turns its direction to center direction. Therefore, the air pressure will decrease at the point where the water flow of the surrounding water flow curtain 112c hits the diffuser object 130c because the shielded space 113c is expanded at this point.

The water flow accelerated by the gap 111c runs rapidly downstream, and the air facing with the water flow of the surrounding water flow curtain 112c is introduced. Especially, the air is rapidly introduced into the surrounding water flow curtain 112c where the air pressure is decreased by hitting the diffuser object 130c as shown in FIG. 12 (a), so a large amount of air is mixed and the high quality foamed water is obtained. The water flow becomes a thin water flow curtain and the air is introduced into the thin water flow curtain, so the bubbles are spread out and diffused uniformly, and then the high quality foamed water is obtained.

The generated foamed water runs from the diffuser object 130c to the foam water outflow opening 150c.

As shown in FIG. 12 (a), the foamed water generated in the shielded space 113c of the air cavity runs out from the foam water outflow opening 150c, which is the gap between the diffuser object 130c and the wall 1013. Because whole area of the foam water outflow opening 150c is occupied and covered by the foamed water, the outside air does not come from the foam water outflow opening 150c. The shielded space 113c is not ventilated via the foam water outflow opening 150c. In this configuration, the airtightness of the shielded space 113c can be maintained even while the generated foamed water flows out from the foam water outflow opening 150c.

Embodiment 4

Embodiment 4 shows the foamed water saving aerator configuration, in which, the surrounding water flow curtain is the frustoconical shape, the shielded space is an outer space between the surrounding water flow curtain and the wall of the air cavity, and the diffuser object is the wall attached to the wall of the air cavity. The diffuser object has a skew to turn the water flow of the surrounding water flow curtain to downward.

In the following description in embodiment 4, the description for the components which are the same as those of embodiment 1 is omitted hereinafter; the description for the components which are not employed in embodiment 1 is emphasized.

Figure 13:
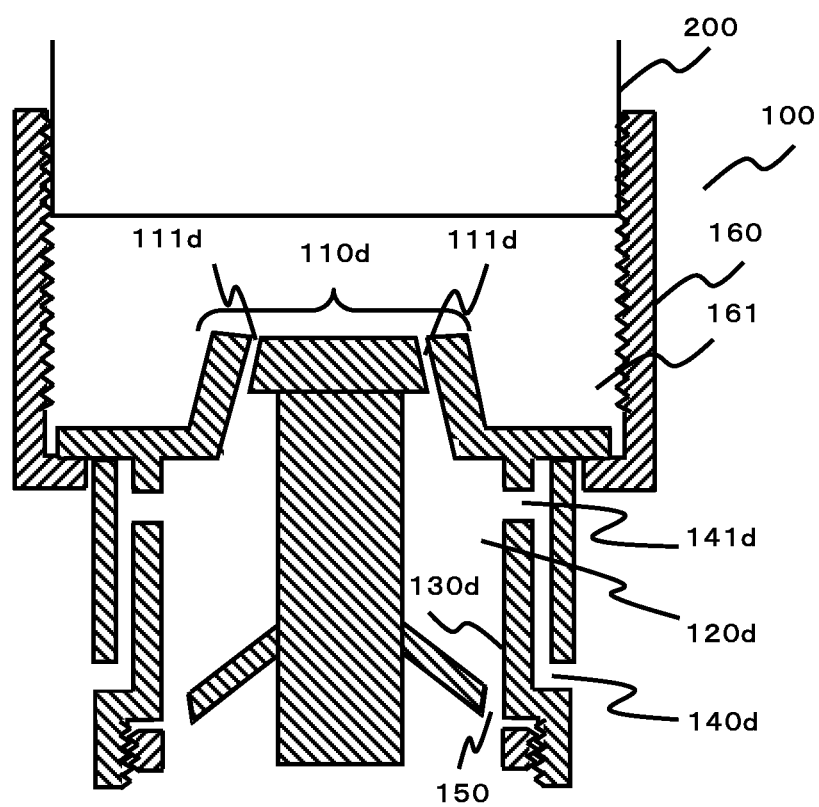
FIG. 13 is a schematic view of the foamed water saving aerator 100d of the present invention in embodiment 4.

FIG. 13 is a schematic view of the foamed water saving aerator 100d which generates the surrounding water flow curtain as the frustoconical shape.

As shown in FIG. 13, the foam water saving aerator 100d comprises the surrounding water flow curtain forming portion 110d, the air cavity 120, the diffuser object 130d, the air ventilation pass 140d, the foam water outflow opening 150 and the attachment 160. In order to understand the internal structure easily, FIG. 13 is shown in the vertical cross sectional view.

Figure 14:
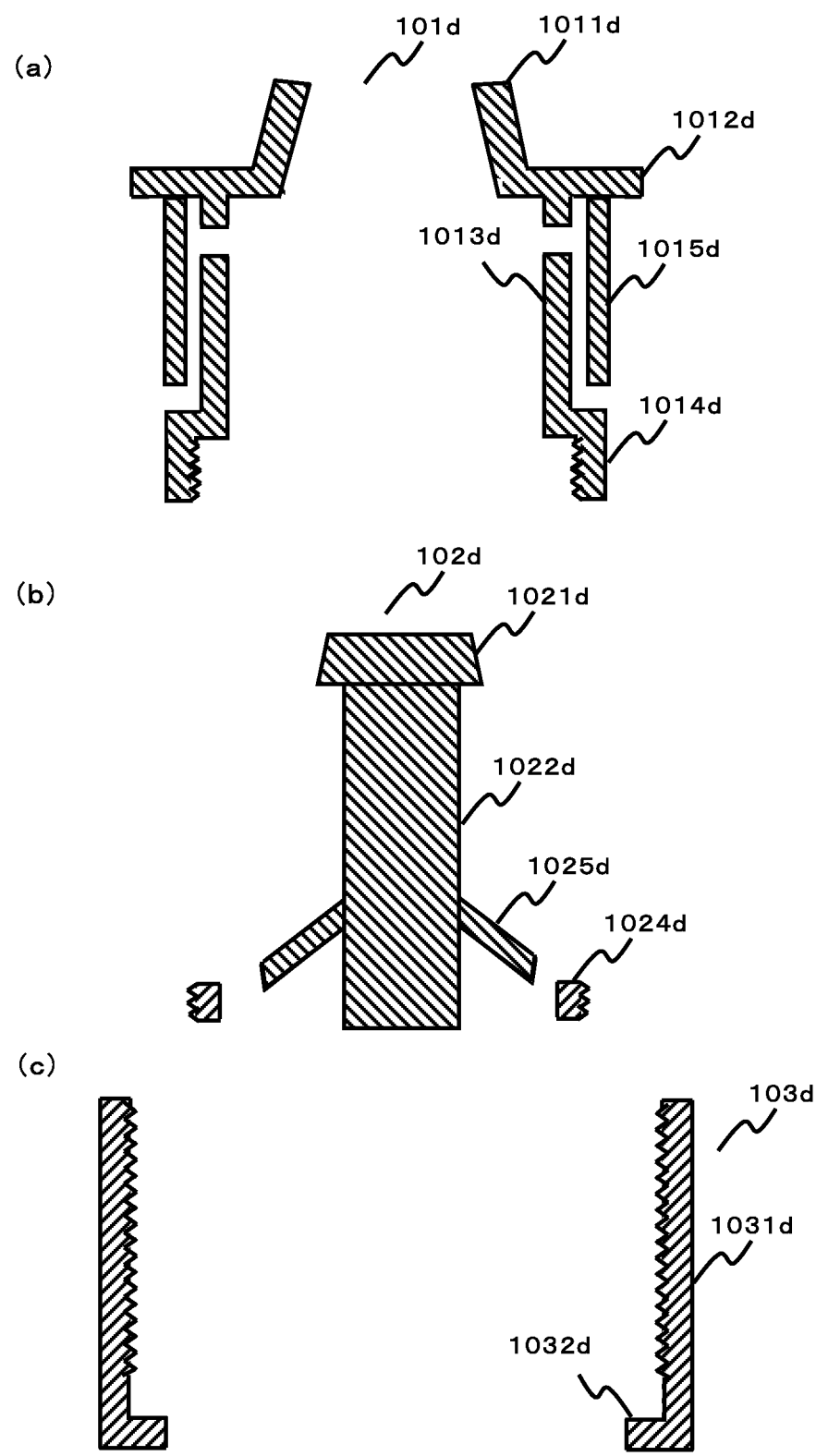
FIG. 14 is an exploded view showing the configuration of the foamed water saving aerator 100d as the part 101d, the part 102d and the part 103d.

As shown in the exploded configuration in FIG. 14, there are 3 parts; the part 101c, the part 102c and the part 103c are combined.

In this configuration, the surrounding water flow curtain forming portion 110d is formed in the upper portion of the part 101 and the part 102. The shape of the inner wall of the surrounding water flow curtain forming portion 110d is the same as that of the embodiment 2. The surrounding water flow curtain 112d is generated in the air cavity 120 as the frustoconical shape closed water flow curtain the same as the surrounding water flow curtain 112 shown in FIG. 9.

The air cavity 120d is provided as the space surrounded by the inner wall of the central tubular body 1013d of the part 101d and the outer wall of the tubular body 1022d of the part 102d.

The diffuser object 130d is different from the diffuser object 130 shown in FIG. 1, and it is provided as the part attached to the part 101c. The wall 1013d works as a part of the wall of the air cavity 120 and also works as the diffuser object 130d. In this configuration, the diffuser object 130d is a simple vertical wall, but it can turn the water flow, which is flushed from the center to the periphery side, downward.

In this configuration, as shown in FIG. 14, the umbrella-shaped object 1025d is attached to the part 102d. This umbrella-shaped object 1025d is different from the diffuser object. The surrounding water flow curtain does not hit the umbrella-shaped object 1025d directly, and it can seal the bottom surface of the air cavity 120.

The air ventilation pass 140d is formed in the part 102d side the same as embodiment 3. In this configuration, the air ventilation pass 140d is formed among the part 1013d of the part 102d, the part 1014d and the part 1015d to ventilate the outer air.

Figure 15:
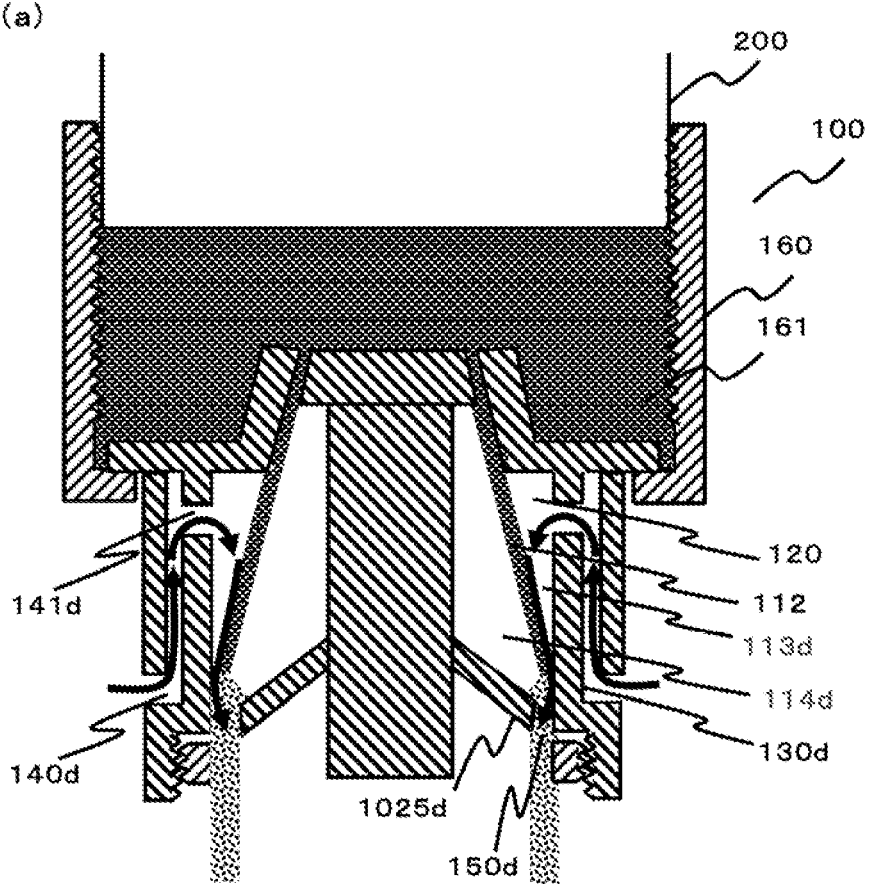
FIG. 15 is a schematic view of the status when the water is running through the foamed water saving aerator 100d.
Figure 15:
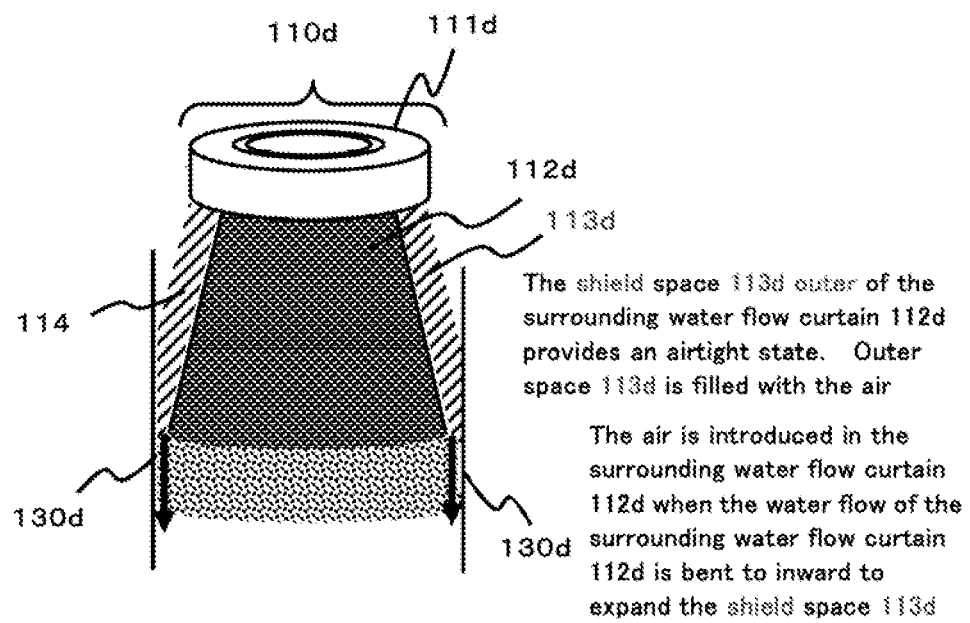

FIG. 15 (a) is a schematic view showing the state when the water flow is running through the foamed water saving aerator 100d from the faucet 200. As with FIG. 5 (a), it is shown in the vertical cross sectional view in order to understand the internal water flow state easily. The water flow, the air flow and the generated foamed water are shown simply.

The water supplied from the faucet 200 to the water cavity 161 is accepted on the upper surface of the surrounding water flow curtain forming portion 110d and the water goes downs via the gap 111d by the water pressure of the water cavity 161. The accelerated water flow generates the frustoconical shape surrounding water flow curtain 112d as shown in FIG. 15 (b).

As shown in FIG. 15 (a) and FIG. 15 (b), this surrounding water flow curtain 112d has no break, so the air cavity 120 is divided into the inner space and outer space by the surrounding water flow curtain 112d. The outer space of the surrounding water flow curtain 112d is surrounded by the surrounding water flow curtain 112d and the wall 1013d, so the outer space becomes the shielded space 113d having the airtightness.

The outer space of the surrounding water flow curtain 112d keeps the airtightness, and it is provided as the shielded space 113d filled with the air. The rest part 114d as the inner space of the surrounding water flow curtain 112d is also filled with the air.

The mechanism of the air injection to the surrounding water flow curtain 112d generated by the water flow flushed from the gap 111d is the same as that of the embodiment 1. In the embodiment 1, the air is injected to the surrounding water flow curtain from the inner space 113, but in this embodiment 4, the air is injected to the surrounding water flow curtain from the shieleded space 113d. The air injection direction is opposite.

In this configuration, as shown in FIG. 15 (a) and FIG. 15 (b), the water flow of the surrounding water flow curtain 112d flushes outward, and there is a wall of the part 1013d in front of the flushing water. This wall of the part 1013d works as the diffuser object 130d. The water flow of the frustoconical shape surrounding water flow curtain 112d turns downward by hitting the diffuser object 130d. Therefore, the air pressure will decrease at the point where the water flow of the surrounding water flow curtain 112d hits the diffuser object 130d because the shielded space 113d is expanded downwardly.

The water flow accelerated by the gap 111d runs rapidly downstream, and the air facing with the water flow of the surrounding water flow curtain 112d is introduced. Especially, the air is rapidly introduced into the surrounding water flow curtain 112d at the point where the water flow turns downward by hitting the diffuser object 130c and the air pressure is decreased as shown in FIG. 12 (a), so a large amount of air is mixed and the high quality foamed water is obtained. The water flow becomes a thin water flow curtain and the air is introduced into the thin water flow curtain, so the bubbles are spread out and diffused uniformly, and the high quality foamed water is obtained.

The generated foamed water runs from the gap between the part 1025d and the wall 1013d to the foam water outflow opening 150d.

As shown in FIG. 15 (a), the foamed water generated in the shielded space 113c of the air cavity runs out from the foam water outflow opening 150c which is the gap between the part 1025d and the wall 1013d. Because the whole area of the foam water outflow opening 150d is occupied and covered by the foamed water, the outside air does not come from the foam water outflow opening 150d. The shielded space 113c is not ventilated directly via the foam water outflow opening 150d. In this configuration, the airtightness of the shielded space 113c can be maintained even while the generated foamed water flows out from the foam water outflow opening 150d.

Embodiment 5

Embodiment 5 shows the foamed water saving aerator configuration, in which there are several gaps in the surrounding water flow curtain forming portion, and the accelerated water flows flushed from the gaps are merged and form the three-dimensional surrounding water flow curtain generated in the air cavity space.

There are several patterns and arrangement of the gaps in the surrounding water flow curtain forming portion.

Figure 16:
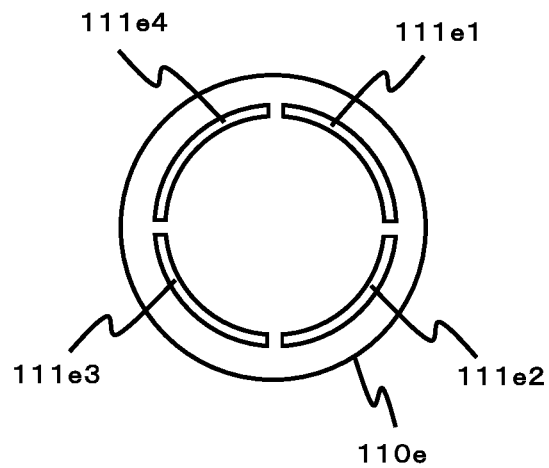
FIG. 16 is a schematic view of the foamed water saving aerator 100e of the present invention comprising a plurality of gaps in embodiment 5.
Figure 16:
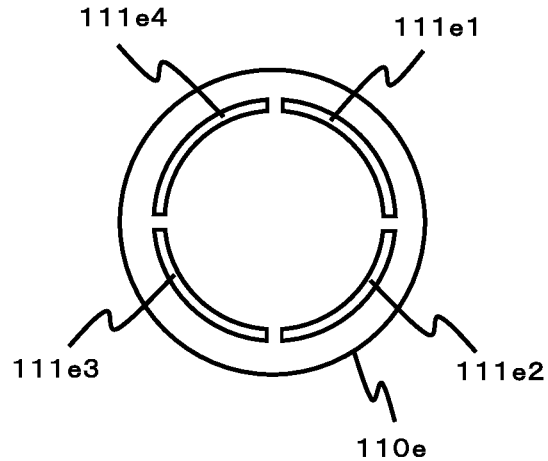

FIG. 16 is a schematic view of the surrounding water flow curtain forming portion 110e comprising a plurality of gaps of the present invention in embodiment 5. FIG. 16 (a) is a cross sectional horizontal view of the upper portion of the surrounding water flow curtain forming portion 110e, FIG. 16 (b) is a cross sectional horizontal view of the bottom portion of the surrounding water flow curtain forming portion 110e.

The surrounding water flow curtain forming portion 110e comprises plural gaps 111e arrayed in a circle. In this example, there are 8 gaps, which are from the gap 111e1 to the gap 111e8 arrayed in a circle.

For example, each gap 111e may have the vertical wall without skew or may have the skewed wall whose length becomes large according to the depth.

Figure 17:
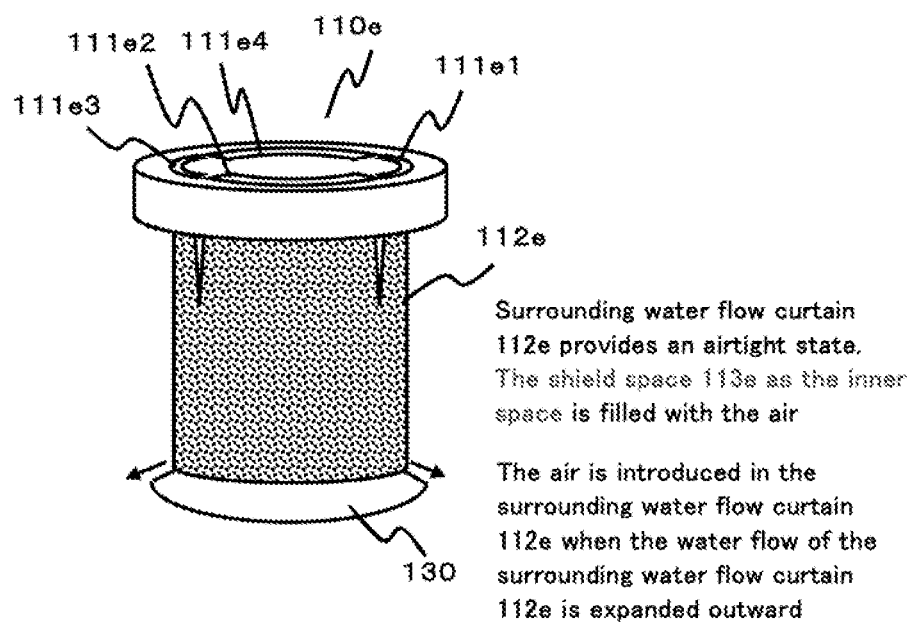
FIG. 17 is a schematic view of the status when the water is running through the foamed water saving aerator 100e.

FIG. 17 (a) is a schematic view showing the status when the water flow is running through the foamed water saving aerator 100e from the faucet 200. As shown in FIG. 17 (a), the accelerated water flow flushes from each gap 111e1 to gap 111e8 as the curtain-shaped water flow, and the flushing water flow merges and is superimposed as the three-dimensional surrounding water flow curtain 112e. In this embodiment, as shown FIG. 17, there is a small break in the upper portion of the surrounding water flow curtain 112e. However, the flushing curtain-shaped water flow close near to each other, each flushing curtain-shaped water flow pulls physically each other and merged. The flushing water flow smoothly merges immediately, so the three-dimensional surrounding water flow curtain 112e without break is generated as a whole. In this invention, it is preferable that the three-dimensional surrounding water flow curtain 11e without break perfectly, but the three-dimensional surrounding water flow curtain with very small breaks or very small hole in the water flow curtain can work as the surrounding water flow curtain 112e for providing the shielded space 113e.

The curtain-shaped water flow is provided as the wall substantially without break the same as embodiment 1, the water flow curtain divides the air cavity 120e into the inner space of the surrounding water flow curtain 112e and the outer space, and the inner space of the surrounding water flow curtain 112e becomes the shield space 113e whose airtightness is maintained.

The mechanism of the air injection to the surrounding water flow curtain 112e generated by the water flow flushed from the surrounding water flow curtain forming portion 110e is the same as that of the embodiment 1.

Figure 18:
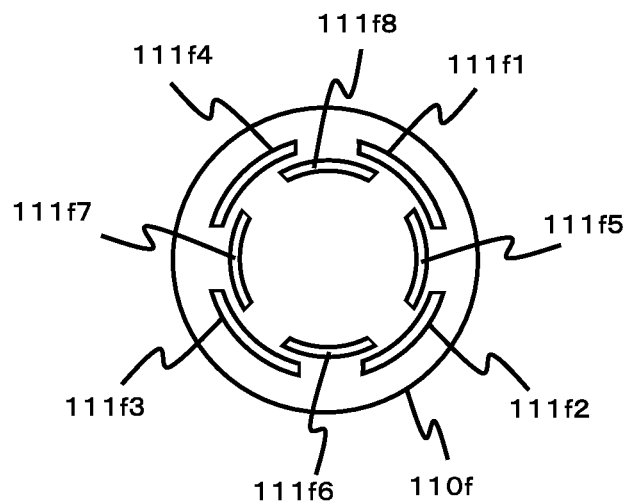
FIG. 18 is a schematic view of another foamed water saving aerator 100f of the present invention comprising a plurality of gaps in embodiment 5.
Figure 18:
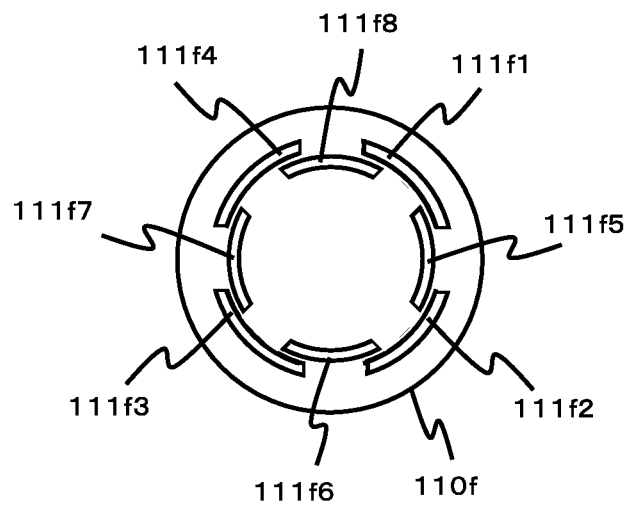

Next, the surrounding water flow curtain forming portion 110f comprises a plurality of gaps having a different pattern from that shown in FIG. 16. FIG. 18 (a) is the horizontal cross sectional view of the upper portion of the surrounding water flow curtain forming portion 110f, FIG. 18 (b) is the horizontal cross sectional view of the bottom portion of the surrounding water flow curtain forming portion 110f.

As shown in FIG. 18 (a) and FIG. 18(b), the surrounding water flow curtain forming portion 110f provides a plurality of gaps 111f arrayed in a circle. In this example, there are 8 gaps, which are from the gap 111f/1 to the gap 111f/8, arrayed in a concentric double circle. There are the outer line and the inner line. The outer line includes the gap 111f/1 to the gap 111f/4, the inner line includes the gap 111f/5 to the gap 111f/8.

For example, the gap 111f/1 to the gap 111f/4 has the vertical wall without skew in depth, and the gap 111f/5 to the gap 111f/8 have the skewed wall with taper to the outside according to the depth. Therefore, the setting of the gap 111f/1 to the gap 111f/4 and the setting of the gap 111f/5 to the gap 111f/8 are close to each other in the lower position. It is preferable that the taper is adjusted for assisting the water flow curtain flushed from the gap 111f/1 to the gap 111f/4 and the water flow curtain flushed from the gap 111f/5 to the gap 111f/8 to merge and generate the whole surrounding water flow curtain 112e.

Figure 19:
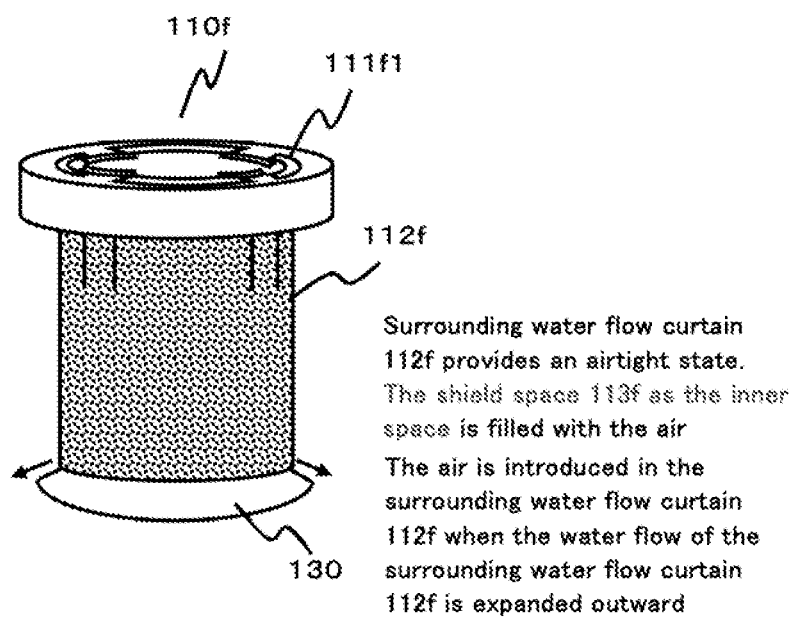
FIG. 19 is a schematic view of the status when the water is running through the foamed water saving aerator 100f.

FIG. 19 is a schematic view showing the state when the water flow is running through the foamed water saving aerator 100f from the faucet 200. As shown in FIG. 19, the accelerated water flow flushes from each gap 111f/1 to gap 111f/8 as the curtain-shaped water flow, and the flushing water flow merges and is superimposed as the three-dimensional surrounding water flow curtain 112f. In this embodiment, as shown FIG. 19, there is a small break in the upper portion of the surrounding water flow curtain 112f. However, the angle of the flushing curtain-shaped water flow is adjusted as the angle that allows the flushing curtain-shaped water flow to merge easily. In addition, the flushing curtain-shaped water flow close near to each other, so each flushing curtain-shaped water flow pulls physically each other and merged. The flushing water flow smoothly merged immediately, so the three-dimensional surrounding water flow curtain 112f without break is generated as a whole. In this invention, the three-dimensional surrounding water flow curtain with very small breaks or very small hole in the water flow curtain can work as the surrounding water flow curtain for providing the shielded space 113f.

The curtain-shaped water flow is provided as the wall substantially without break the same as embodiment 1, the water flow curtain divides the air cavity 120f into the inner space of the surrounding water flow curtain 112f and the outer space, and the inner space of the surrounding water flow curtain 112f becomes the shielded space 113f whose airtightness is maintained.

The mechanism of the air injection to the surrounding water flow curtain 112f generated by the water flow flushed from the surrounding water flow curtain forming portion 110f is the same as that of the embodiment 1.

As shown above, according to the foamed water saving aerator 100e and 100f of the embodiment 5, the surrounding water flow curtain is generated in the air cavity and the inner space is provided as the shielded space 113f. The air is injected to the water thin film of the surrounding water flow curtain by decreasing its air pressure by the curtain-shape water flow. High quality foamed water can be generated.

Embodiment 6

Embodiment 6 shows the foamed water saving aerator configuration, in which there is a ventilation pass variable mechanism for varying the hole size of the ventilation pass and varying the speed of the air drawn from the ventilation pass, wherein the speed of the air mixed to the surrounding water flow curtain can be adjusted.

Figure 20:
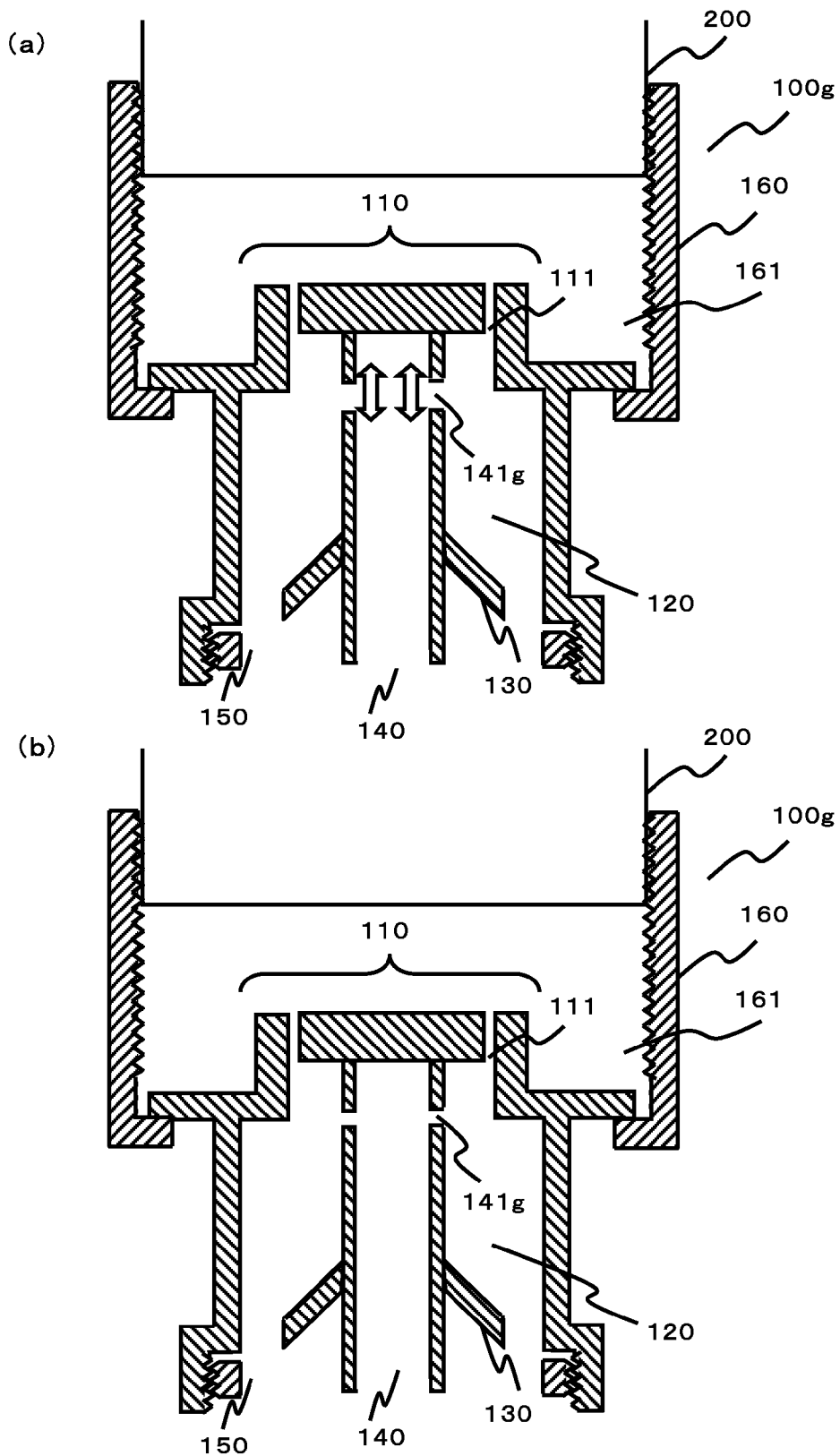
FIG. 20 is a schematic view of another foamed water saving aerator 100g comprising a ventilation pass variable mechanism for varying the hole size of the ventilation pass 141g.

FIG. 20 is a schematic view of the foamed water saving aerator 100g comprising a ventilation pass variable mechanism for varying the hole size of the ventilation pass 141g. The ventilation pass variable mechanism can be applied to any of the foamed water saving aerators 100 shown in embodiment 1 to embodiment 5. For example, the ventilation pass variable mechanism applied to foamed water saving aerator shown in embodiment 1 is described.

As shown in FIG. 20 (a), the width of the ventilation pass 141g of the foamed water saving aerator 100 can be adjustable. The configuration of the ventilation pass variable mechanism is not shown in FIG. 20. A suitable mechanism that can widen or narrow the ventilation pass 141g can be employed. For example, a slide mechanism for sliding a shutter covering a part of the ventilation pass 141g, or a mechanism for varying the wall forming the edge of the ventilation pass 141g can be employed as the ventilation pass variable mechanism.

FIG. 20 (b) shows the status of the adjusted ventilation pass 141g whose width is narrowed from the state of the ventilation pass 141g shown in FIG. 1. If the width of the ventilation pass 141g become small, the air speed injected from the ventilation pass 141g varies according to the area (width) of the ventilation pass 141g because the amount of the ventilated air to the shielded space 113 is determined by the air pressure decrease of the shielded space 113 of the surrounding water flow curtain 112. As a result, the air speed injected from the adjusted ventilation pass 141g shown in FIG. 20 (b) to the shielded space 113 becomes faster than that injected from the ventilation pass 141 shown in FIG. 1

The surface area for contacting the air in the shielded space 113 is the same in both the surrounding water flow curtain 112 generated in the air cavity 120 in the foamed water saving aerator 100 shown in FIG. 1 and the surrounding water flow curtain 112 generated in the air cavity 120 in the foamed water saving aerator 100 shown in FIG. 20 (b). Therefore, the amount of the air introduced into the surrounding water flow curtain 112 becomes large according to the speed of the air injected from the shielded space 113.

As shown above, the width of the ventilation pass 141g can be adjustable, and the ventilation pass variable mechanism is employed. The speed of the air injection to the surrounding water flow curtain 112 can be adjustable, and the amount of the air injected to the surrounding water flow curtain 112 can be adjustable.

Embodiment 7

Embodiment 7 shows the foamed water saving aerator configuration, in which there is a gap width variable mechanism for varying the gap width, and the thickness of the surrounding water flow curtain can be adjusted.

Figure 21:
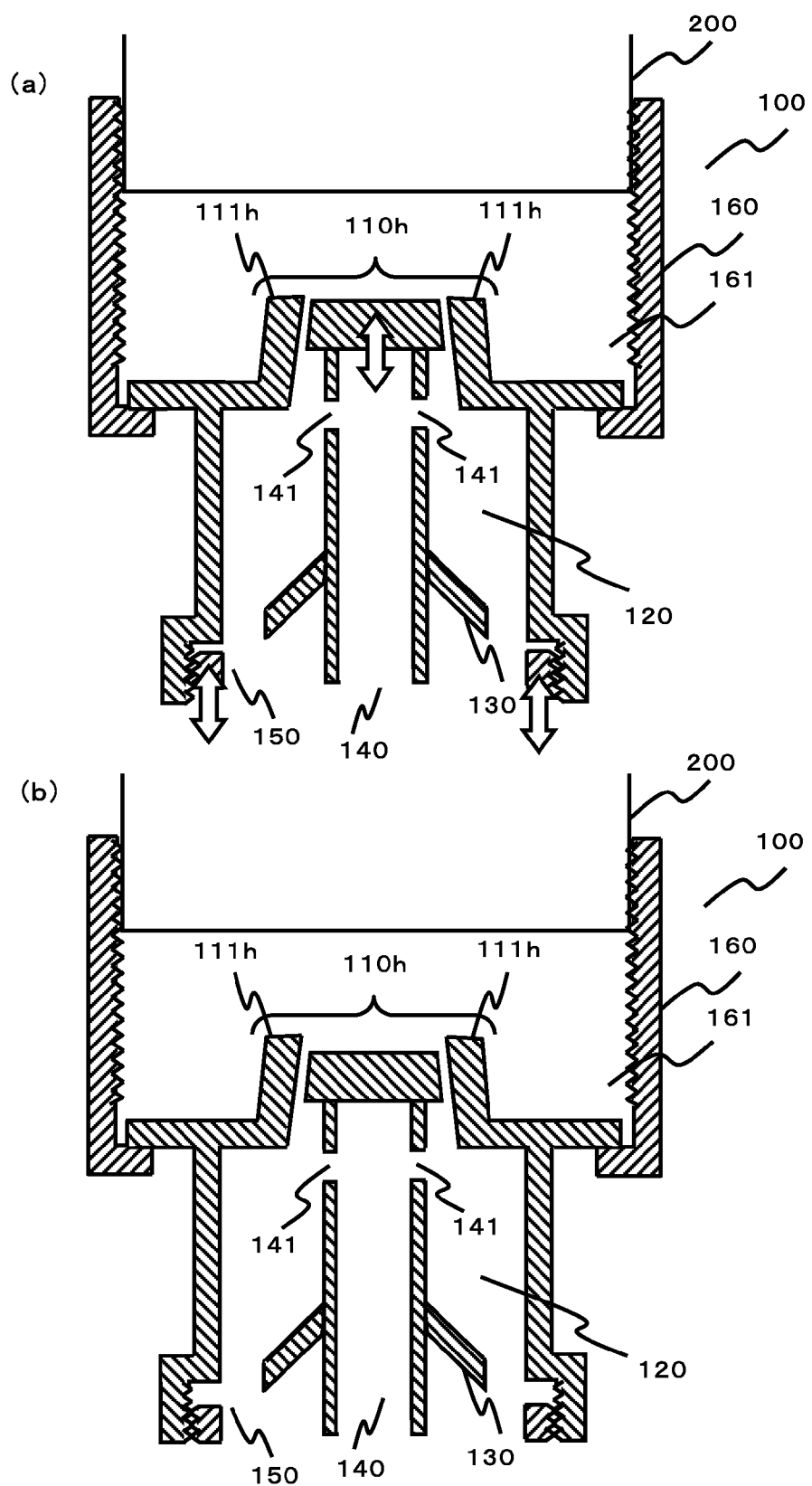
FIG. 21 is a schematic view of another foamed water saving aerator 100h comprising a gap width variable mechanism for varying the gap width 111h.

FIG. 21 is a schematic view of the foamed water saving aerator 100h comprising a gap width variable mechanism. The gap width variable mechanism can be applied to any of the foamed water saving aerator 100 shown in embodiment 1 to embodiment 6. For example, the gap width variable mechanism applied to foamed water saving aerator shown in embodiment 3 is described.

As shown in FIG. 21 (a), in the foamed water saving aerator 100h, the part 102 shown in FIG. 2 can be adjusted upwardly and downwardly by screwing into the part 101, and the disk 1021 of the part 102 and the upper tubular 1011 of the part 101 can be moved relatively. Any structure can be employed as a gap width variable mechanism that can move the disk 1021 of the part 102 and the upper tubular 1011 of the part 101 relatively.

FIG. 21 (b) is a schematic view of the state in which the width of the gap 111h becomes large by shifting the disk 1021 of the part 102 shown in FIG. 2 downward relative to the upper tubular body 1011 of the part 101. If the width of the gap 111h becomes large, the thickness of the water flow of the surrounding water flow curtain 112h injected from the surrounding water flow curtain forming portion 110h increases. The accelerated water flow speed is in inverse proportion to the cross sectional area of the gap. Therefore, the speed of the surrounding water flow curtain 112h flushed from the gap 111h shown in FIG. 21 (b) to the air cavity 120 become slower than the surrounding water flow curtain 112b flushed from the gap 111b shown in FIG. 3 to the air cavity 120.

If the width of the gap 111h becomes large, the thickness of the water flow of the surrounding water flow curtain 112h becomes large, and the speed of the water flow of the surrounding water flow curtain 112h becomes slow. As a result, the amount of the air introduced into the surrounding water flow curtain 112h from the shielded space 113 becomes small, and the air volume ratio of the surrounding water flow curtain 112h becomes small because of the decrease of the amount of the introduced air and the increase of the thickness of the water flow.

If the width of the gap 111h becomes small, the thickness of the water flow of the surrounding water flow curtain 112h becomes small, and the speed of the water flow of the surrounding water flow curtain 112h becomes slow. As a result, the amount of the air introduced into the surrounding water flow curtain 112h from the shielded space 113 becomes small, and the air volume ratio of the surrounding water flow curtain 112h becomes small because of the decrease of the amount of the involved air and the decrease of the thickness of the water flow.

According to the water saving aerator, if the foamed water saving aerator employs the gap width variable mechanism, the adjustment of the thickness and speed of the surrounding water flow curtain can be controlled, and the amount of the air involved in the surrounding water flow curtain can be adjusted.

While some preferable embodiments of the water saving aerator according to the present invention are described above, it should be understood that various changes are possible, without deviating from the technical scope according to the present invention. Therefore, the technical scope according to the present invention is limited only by the claims attached.

INDUSTRIAL APPLICABILITY

The water saving aerator according to the present invention can be used as the water saving apparatus and the bubble foam water generator. The water saving aerator can be applied to various apparatus not limited for its use. For example, it can be applied to the water tap not only for commercial use but also for special use such as laboratory use, the special water delivery pipe such as the water delivery pipe for eye-washing water tap in a pool facility and the shower head.

The invention claimed is:

1. A foam water saving aerator to be attached to a water tap for generating bubble foam water and flowing the generated bubble foam water, comprising:
   a surrounding water flow curtain forming portion including a gap for flushing water flow, and forming a three-dimensional surrounding water flow curtain in which an accelerated water flow flushes downstream from the gap;
   an air cavity that provides an intermediate water-flow route as a place for forming the surrounding water flow curtain, which sustains an air-filled condition when a water flow of the surrounding water flow curtain flushes therein;

a diffuser object provided at a point that receives an impact of the water flow of the surrounding water flow curtain in the air cavity, the diffuser object changing a direction of the water flow of the surrounding water flow curtain to another direction for expanding a shielded space, wherein expanding the shielded space reduces air pressure and closes a bottom of the shielded space with the diffused water flow of the surrounding water flow curtain to form the airtightness of the shielded space; and a ventilation pass that supplies outside air to an inside of the expanding shielded space, wherein the outside air is supplied to the expanding shielded space via an air ventilation hole;

wherein the foamed water is generated by supplying the outside air through the air ventilation hole by reducing the air pressure at the expansion position of the shielded space by changing the water flow of the surrounding water flow curtain.

2. A foam water saving aerator according to claim 1, in which the gap of the surrounding water flow curtain forming portion is a circular gap, wherein the shape of the surrounding water flow curtain flushed from the circular gap becomes a cylinder shape.

3. A foam water saving aerator according to claim 1, in which the gap of the surrounding water flow curtain forming portion is a circular gap and has a taper whose diameter decreases according to a depth, wherein the shape of the surrounding water flow curtain flushed from the circular gap becomes an inverted frustoconical shape.

4. A foam water saving aerator according to claim 1, in which the gap of the surrounding water flow curtain forming portion is a circular gap and has a taper whose diameter increases according to a depth, wherein the shape of the surrounding water flow curtain flushed from the circular gap becomes a frustoconical shape.

5. A foam water saving aerator according to claim 1, wherein the shielded space is an inner space of the surrounding water flow curtain; wherein the diffuser object contacts the bottom surface of the surrounding water flow curtain and has skew to change the water flow direction of the surrounding water flow curtain to outside; and wherein the air is introduced into the surrounding water flow curtain from the inner space at a turning position of the water flow of the surrounding water flow curtain.

6. A foam water saving aerator according to claim 1, wherein the shielded space is an outer space between the surrounding water flow curtain and a wall of the air cavity; wherein the diffuser object contacts the bottom surface of the surrounding water flow curtain and has skew to change the water flow direction of the surrounding water flow curtain toward center; and wherein the air is introduced into the surrounding water flow curtain from the outer space at a turning position of the water flow of the surrounding water flow curtain.

7. A foam water saving aerator according to claim 1, wherein the position, the shape and the size of a foam water outflow opening from which the generated foam water runs out are adjusted wherein a running foam water outflow occupies and covers a whole area of the foam water outflow opening, and no air pass for the outside air exists in the shielded space via the foam water outflow opening, the only air pass existing in the shielded space is via the ventilation pass, and the airtightness of the shielded space is maintained while the foam water flushes from the shielded space via the foam water outflow opening.

8. A foam water saving aerator according to claim 1, wherein there are several gaps in the surrounding water flow curtain forming portion, the accelerated water flows flushed from the gaps are merged and forms the three-dimensional surrounding water flow curtain generated in the air cavity space.

9. A foam water saving aerator according to claim 1, wherein the surrounding water flow curtain is converted to foam water as it flows downward through the aerator.

10. A foam water saving aerator according to claim 1, further comprising; a surrounding water flow curtain surface area variable mechanism for varying the shape and surface area of the surrounding water flow curtain formed in the air cavity; wherein the amount of the air mixed to the surrounding water flow curtain can be adjusted by varying the contact area between the surrounding water flow curtain and the supplied air.

11. A foam water saving aerator according to claim 1, further comprising a ventilation pass variable mechanism for varying the hole size of the ventilation pass and varying the speed of the air vacuumed from the ventilation pass, wherein the speed of the air mixed to the surrounding water flow curtain can be adjusted.

12. A foam water saving aerator according to claim 1, further comprising a gap width variable mechanism for varying the gap width, wherein the thickness of the surrounding water flow curtain can be adjusted.

* * * * *